US011561923B2

(12) United States Patent
Jamadagni et al.

(10) Patent No.: US 11,561,923 B2
(45) Date of Patent: *Jan. 24, 2023

(54) METHOD FOR TRAINING MULTICHANNEL DATA RECEIVER TIMING

(71) Applicant: Oracle International Corporation, Redwood Shores, CA (US)

(72) Inventors: Navaneeth P. Jamadagni, San Francisco, CA (US); Ji Eun Jang, Foster City, CA (US); Anatoly Yakovlev, Hayward, CA (US); Vincent Lee, San Mateo, CA (US); Guanghua Shu, San Carlos, CA (US); Mark Semmelmeyer, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/221,580

(22) Filed: Apr. 2, 2021

(65) Prior Publication Data

US 2021/0224221 A1 Jul. 22, 2021

Related U.S. Application Data

(63) Continuation of application No. 16/251,066, filed on Jan. 17, 2019, now Pat. No. 10,983,944.

(51) Int. Cl.
*G06F 13/40* (2006.01)
*G06F 13/42* (2006.01)

(52) U.S. Cl.
CPC ...... *G06F 13/4291* (2013.01); *G06F 13/4217* (2013.01); *G06F 13/4072* (2013.01)

(58) Field of Classification Search
None
See application file for complete search history.

(56) References Cited

U.S. PATENT DOCUMENTS 5,872,959 A 2/1999 Nguyen et al.
7,647,467 B1 1/2010 Hutsell et al.
(Continued)

OTHER PUBLICATIONS

Jedec Standard, Embedded Multi-Media Card (e-MMC) Electrical Standard (5.1), JESD84-B51, (Revision of JESD84-B50.1, Jul. 2014), Feb. 2015, 352 pages.
(Continued)

*Primary Examiner* — Ernest Unelus
*Assistant Examiner* — Dayton Lewis-Taylor
(74) *Attorney, Agent, or Firm* — Kowert, Hood, Munyon, Rankin & Goetzel, P.C.; Scott W. Pape; Dean M. Munyon

(57) ABSTRACT

An apparatus includes a first device having a clock signal and configured to communicate, via a data bus, with a second device configured to assert a data strobe signal and a plurality of data bit signals on the data bus. The first device may include a control circuit configured, during a training phase, to determine relative timing between the clock signal, the plurality of data bit signals, and the data strobe signal. The first device may determine, using a first set of sampling operations, a first timing relationship of the plurality of data bit signals relative to the data strobe signal, and determine, using a second set of sampling operations, a second timing relationship of the plurality of data bit signals and the data strobe signal relative to the clock signal. During an operational phase, the control circuit may be configured to use delays based on the first and second timing relationships to sample data from the second device on the data bus.

20 Claims, 12 Drawing Sheets

(56) References Cited

U.S. PATENT DOCUMENTS

| | | |
|---|---|---|
| 9,135,981 B2* | 9/2015 | Seo .................... G11C 11/4093 |
| 9,811,273 B1 | 11/2017 | Brahmadathan |
| 10,546,620 B2 | 1/2020 | Giaccio et al. |
| 2005/0066142 A1 | 3/2005 | Bhattacharya et al. |
| 2014/0032826 A1 | 1/2014 | Lee et al. |
| 2014/0355370 A1* | 12/2014 | Kim .................. G11C 11/40615 |
| | | 365/222 |

OTHER PUBLICATIONS

7 Series FPGAs SelectIO Resources, User Guide, UG471 (v1.8) Sep. 27, 2016, 188 pages.
7 Series FPGAs Clocking Resources, User Guide, UG472 (v1.13) Mar. 1, 2017, 114 pages.

* cited by examiner

METHOD FOR TRAINING MULTICHANNEL DATA RECEIVER TIMING

PRIORITY CLAIM

The present application is continuation of U.S. application Ser. No. 16/251,066, filed Jan. 17, 2019 (now U.S. Pat. No. 10,983,944), which is incorporated by reference herein in its entirety.

BACKGROUND

Technical Field

This invention relates to computing network systems, and more particularly, to multichannel data receivers used in a computer system.

Description of the Relevant Art

Performance of a computer system is commonly impacted by movement of information via one or more communication channels. Information, including program instructions as well as data, may be shared between various devices within the computer system in addition to sharing with other computer systems and devices external to the computer system. For example, the computer system may read and write data to a storage device via a memory interface such as embedded MultiMediaCard (eMMC), Universal Flash Storage (UFS), Serial AT Attachment (SATA), and the like. The computer system may also share information with external devices using interfaces such as Universal Serial Bus (USB) and Ethernet, as well as wireless interfaces such as Bluetooth and WiFi.

These interface examples may involve communication over a length of cable between two circuit boards, over copper traces between two devices on a common circuit board, or over metal lines between two functional blocks within a single integrated circuit (IC). Implementations of these interfaces may make use of various serial and/or parallel data transfer methods for moving information between devices while managing constraints such as transfer speed, power consumption, bit error rates, and system costs. Reducing system costs, for example, can include using commercially available components that may not provide optimal characteristics for a particular implementation. These limiting characteristics may compromise other constraints such as transfer speed and/or bit error rates.

SUMMARY OF THE EMBODIMENTS

Systems and methods for improving the reliability and performance of systems utilizing serialized data transmission are contemplated. An embodiment of an apparatus comprises a first device having a clock signal and configured to communicate, via a data bus, with a second device configured to assert a data strobe signal and a plurality of data bit signals on the data bus. The first device may include a control circuit configured, during a training phase, to determine relative timing between the clock signal, the plurality of data bit signals, and the data strobe signal. To determine the relative timing, the control circuit may determine, using a first set of sampling operations, a first timing relationship of the plurality of data bit signals relative to the data strobe signal, and to determine, using a second set of sampling operations, a second timing relationship of the plurality of data bit signals and the data strobe signal relative to the clock signal. During an operational phase, the control circuit may be configured to use delays based on the first and second timing relationships to sample data from the second device on the data bus.

In one example, the control circuit may be further configured, during the training phase, to redetermine, using the delays based on the first and second timing relationships for a third set of sampling operations, the first timing relationship of the plurality of data bit signals relative to the data strobe signal. In another example, the control circuit is further configured to perform the first and second sets of sampling operations by requesting a known data pattern from the second device.

In an embodiment, the control circuit may be further configured to determine the delays based on the first and second timing relationships by comparing the known data pattern to data values received during the first and second sets of sampling operations. In some examples, to determine the first timing relationship, the control circuit may be further configured to determine a respective timing relationship between the data strobe signal and each of the plurality of data bit signals to generate a plurality of data skew values, each data skew value corresponding to a respective data bit signal.

In another example, the control circuit may be further configured to select a maximum data skew value from the plurality of data skew values and set a strobe delay on the data strobe signal based on the maximum data skew value. In one example, the control circuit is further configured to select a maximum data skew value from the plurality of data skew values and set a respective data bit delay on each of the plurality of data bit signals based on a difference between the maximum data skew value and the corresponding data skew value.

These and other embodiments will become apparent upon reference to the following description and accompanying drawings.

BRIEF DESCRIPTION OF THE DRAWINGS

FIG. 12 is a generalized block diagram depicting an embodiment of a computer system While the disclosure is susceptible to various modifications and alternative forms, specific embodiments thereof are shown by way of example in the drawings and will herein be described in detail. It should be understood, however, that the drawings and detailed description are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Figure 1:
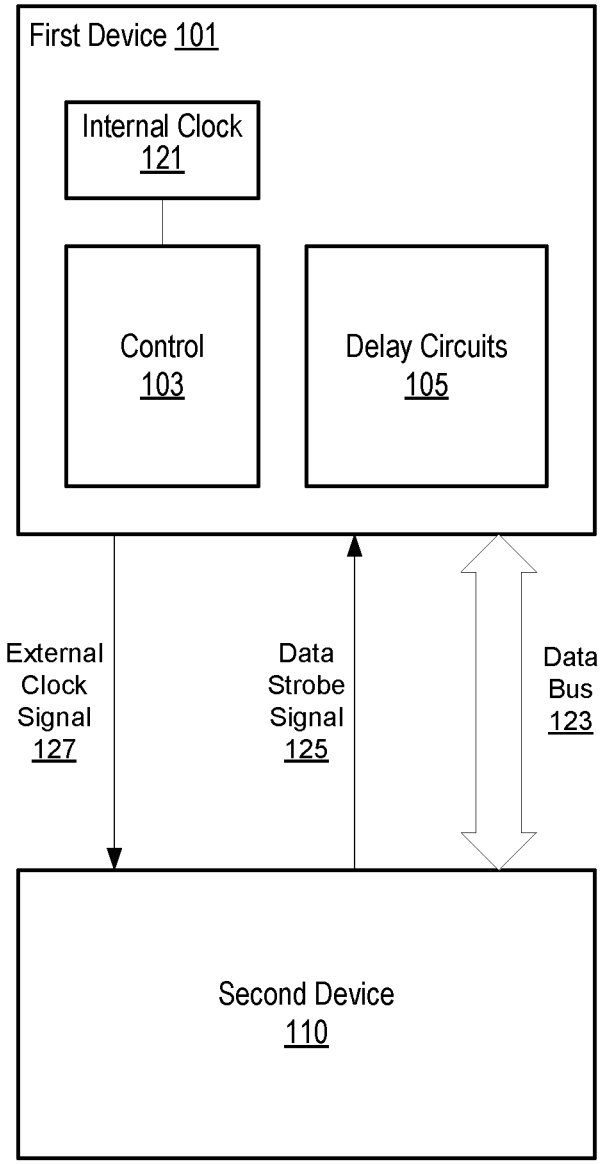
FIG. 1 is a generalized block diagram illustrating an embodiment of a computer system.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Various interfaces may be utilized in a computer system for sharing information with another computer system or device, or between various components within the computer system. Such interfaces include Serial AT Attachment (SATA), embedded MultiMediaCard (eMMC), Universal Flash Storage (UFS), Universal Serial Bus (USB) and Ethernet, as well as wireless interfaces such as Bluetooth and WiFi. Synchronous interfaces utilize one or more clock signals and/or control signals to manage and sample data. For example, a clock signal may be used by a host device to establish a rate for transferring data bits over a data bus, and a data strobe signal may be used by a device transmitting data to indicate when a bit of information is ready to be read from a data bus. These signals and the data bus may be coupled between circuits using a length of cable between two circuit boards, using copper traces between devices on a common circuit board, or using fabricated wires between functional blocks within a single IC.

Non-idealities in signal generation circuits and physical paths of the generated signals in an interface can have detrimental effects on signal timing. Non-idealities may include, for example, differences in signal path length, mismatches in driver strength, variations in loading on different signal lines, as well as other variations that can cause gate and wire delay differences. In addition, operating conditions may increase effects of these non-idealities between signals. For example, power supply fluctuations or temperature changes may impact timing of drivers and impedance of wires resulting in temporal changes in the amount of skew.

Such non-idealities may result in skew and jitter. As used herein, "skew" refers to a deterministic variation in arrival times of corresponding edges of two or more signals, or one signal traveling via two or more paths. For example, a transmitting circuit may assert a data signal with a data value being sent, followed by a corresponding assertion of a data strobe signal to indicate that the data signal currently represents a valid data bit. As disclosed, differences in signal path lengths may result in skew between two or more signals. Routing for the data strobe signal may include a physically longer path than the path for the data signal, causing the assertion of the data strobe signal to arrive at the receiving device later than the assertion of the valid data bit. This variation in arrival time is classified as skew. Timing non-idealities may present further challenges when utilizing a data bus with multiple data signals (e.g., a multichannel data interface). A multichannel interface may use a single clock signal and/or data strobe signal to sample data bits across the multiple data signals. Data skew may result in each data signal arriving at a receiver at a different time, resulting in a small window during which each data signal represents a valid data bit.

Along with skew, jitter may contribute to issues with signal timing. As used herein, "jitter" is the temporal variation in arrival time of a repeated signal edge on a same signal line. In a periodic signal such as a clock signal, a period of the clock signal indicates an amount of time before the signal repeats. Various edges of the clock signal, however, may arrive sooner or later than expected in either a random or deterministic fashion. Random jitter may be caused by power supply noise, interference from crosstalk by another signal, thermal noise, etc. In contrast, deterministic jitter is predictable and may be data pattern dependent, as in the case of intersymbol interference caused by impedance discontinuities along the signal line.

The combination of skew and jitter may put a burden on meeting setup and hold time specifications of electronic circuits. Setup time refers to a minimum time at which data must arrive at an input node of a flip-flop circuit or latch circuit before a clock signal edge. Hold time refers to an amount of time that the data must remain valid after the clock signal edge has arrived. Failure to meet setup and hold times may result in errors when latching a data bit value, also referred to as a bit error. A number of bit errors occurring within a particular time frame is referred to as a bit error rate. To increase transfer speed and/or to reduce bit error rates when communicating via these interfaces, a computer system may perform a training operation for the interface to adjust timing on one or more signals included in the interface to compensate for skew, jitter, and other timing anomalies.

A training operation for a receiving circuit may include determining a timing relationship between the various signals of the interface. As used herein, a "timing relationship" refers to variations in arrival times between two or more signals due to effects such as skew and jitter. To perform a training operation, a transmitting circuit may send a known data pattern. Based on comparisons of sampled data values to the known data values, timing of the arrival of the data signals (e.g., via use of delay circuits) can be adjusted, as well as timing of a data strobe signal for sampling the data signals.

In view of the above, methods and mechanisms for training a multichannel data interface are contemplated. The embodiments illustrated in the drawings and described below may provide techniques for performing a training operation to determine relative timing between a clock signal, a data bus, and a data strobe signal used to communicate with another device. Such a training operation may include performing sampling operations to generate first and second data set. The first data set may be used to determine a timing relationship of the data bus relative to the data strobe signal. The second data set may be used to determine a second timing relationship of the data bus and the data strobe signal relative to the clock signal.

FIG. 1 illustrates a generalized block diagram of an embodiment of system 100 with two devices communicating over a communication interface. System 100 includes first device 101 configured to communicate to second device 110. To support the communication, first device 101 includes control circuit 103 and delay circuits 105 used in conjunction with a communication interface that includes external clock signal 127, data bus 123, and data strobe signal 125. Control circuit 103 receives internal clock signal 121.

First device 101, as illustrated, is configured to communicate with second device 110 via data bus 123. First device 101 may be any suitable type of processing device or circuit capable of digital communication, such as a processor including a host controller for the communication interface. In various embodiments, the processor and host controller may include one or more circuits implemented on a same IC, respective circuits implemented on different ICs mounted to a same circuit board, or on different ICs placed on respective circuit boards coupled by one or more cables. Second device 110 may correspond to any suitable device capable of being accessed via the communication interface. For example, in some embodiments, first device 101 may be a computer system including an eMMC host controller and second device 110 may be an eMMC flash memory card.

First device 101 may be configured to communicate with second device 110 by sending external clock signal 127 to second device 110 and sending and receiving data over data bus 123. External clock signal 127, in some embodiments, may be generated based on internal clock signal 121, while in other embodiments, both internal clock signal 121 and external clock signal 127 may be generated based on a third clock signal. In various embodiments, data bus 123 may include any suitable number of data bit signal lines, for example, 4 data bit signal lines or 8 data bit signal lines. Second device 110 may also receive and send data via data bus 123, using received external clock signal 127 as a control signal for establishing a transfer rate and as an indication for when data bits sent by first device 101 are valid. To send data to first device 101, second device 110 asserts the data bit signal lines of data bus 123 and asserts data strobe signal 125 to indicate when values on data bus 123 are valid and, therefore, ready to be sampled.

As described above, timing non-idealities may be present in system 100, resulting in skew between data bit signals on data bus 123 and data strobe signal 125. The non-idealities may also result in jitter on internal clock signal 121 and/or data strobe signal 125. First device 101, as shown, compensates for timing non-idealities on internal clock signal 121, the data bit signals on data bus 123, and data strobe signal 125. To compensate when receiving data from second device 110, first device 101, using control circuit 103, performs a training operation that uses delay circuits 105 to delay propagation through a corresponding signal path for any or all of data bit signals in data bus 123 and data strobe signal 125.

Control circuit 103, during a training phase, may determine relative timing between internal clock signal 121, the data bit signals on data bus 123, and data strobe signal 125 by determining, using a first set of sampling operations, a first timing relationship of the data bus relative to the data strobe signal. A sampling operation includes control circuit 103 requesting a known data pattern from second device 110. Second device 110 sends the requested data pattern to first device 101 using data bus 123 and data strobe signal 125. Second device 110 may repeat the data pattern for a fixed amount of time or fixed number of repetitions, or for a requested amount of time or requested number of repetitions. In some embodiments, second device 110 may repeat the pattern until control circuit 103 sends an indication to stop sending the pattern. Control circuit 103 uses delay circuits 105 to sample the repeating data pattern on data bus 123 at a variety of sample points. For example, control circuit 103 may initialize a delay on data strobe signal 125 to zero, sample data bus 123 based on a detected transition of data strobe signal 125, and save the sampled value as part of the first set of sampling operations. Control circuit 103 repeats this process, incrementing a delay on data strobe signal 125, until a final delay value is reached. Each sampled value is saved as part of the first set of sampling operations.

As part of a first step in the training operation, control circuit 103 may be configured to determine a first timing relationship by comparing the expected values for the known data pattern to the data values received during the first set of sampling operations. Data valid windows may be determined for each data bit signal in data bus 123. As used herein, "data valid windows" refer to consecutive values for the delay on data strobe signal 125 for which a passing value is sampled on data bus 123. Additionally, a "passing value" refers to a sampled value that corresponds to the expected value for the known data pattern. In the illustrated embodiment, more than one passing value may be accepted. Using the data valid windows, a delay value may be determined for each individual data bit signal. A delay value may then be determined for data strobe signal 125 to, for example, place transitions of data strobe signal 125 near a middle of the delayed data valid windows of the data bit signals of data bus 123.

As part of a second step in the training operation, control circuit 103 may be configured to determine, using a second set of sampling operations, a second timing relationship of the data bit signals on data bus 123 and data strobe signal 125 relative to internal clock signal 121. In this second set of sampling operations, control circuit 103, starting with the delay values determined in the first step, requests the known data pattern from second device 110. In other embodiments, a different known data pattern may be used. Control circuit 103 samples values on data bus 123 in response to a transition of data strobe signal 125, and saves the sampled value as part of the second set of sampling operations. In this second training step, control circuit 103 increments delays for both the data bit signals on data bus 123 and data strobe signal 125. A data value is sampled on data bus 123 after each increment of the delays until a final delay value is reached. In various embodiments, the final delay value may correspond to a predetermined delay value or to a maximum delay value for a particular delay circuit in delay circuits 105. The sampled values are saved as the second set of sampling operations.

In the current embodiment, a second timing relationship is determined by comparing the expected values for the known data pattern to the data values received during the second set of sampling operations. In this second step, the sampled data values are expected to transition from a first passing value to a second passing value. In some embodiments, if the sampled values are all the same value (no transition between passing values is detected), then the transition is assumed to occur outside of a range of delay values achievable by delay circuits 105. In this case, the delays for the data bit signals on data bus 123 and data strobe signal 125 are set to a midpoint delay value since it is not known if the transition would occur near the beginning or the end of the range of delay values. This "midpoint delay value" is used to refer to a value that is halfway between the starting delay values for the second step (i.e., the final delay values from the first step) and the final delay values for the second step. Otherwise, if the sampled values change over the second set of samples, then a transition point is determined, the transition point corresponding to a sampling point in the middle of a transition range when the sampled values change from a first passing value to when the sampled values change to a second passing value. If the transition point occurs after the midpoint delay value, then delays for the data bit signals on data bus 123 and data strobe signal 125 are set to the starting delay values for the second step and otherwise set to the final delay values for the second step.

Control circuit 103, in some embodiments, may be configured to redetermine, using delays based on the first and second timing relationships for a third set of sampling operations, the first timing relationship of the data bit signals on data bus 123 relative to data strobe signal 125. In these embodiments, control circuit 103 performs the third training operation step, which adjusts the timing relationship of the data bus 123 relative to the data strobe signal 125 while minimally affecting the timing relationship of the data strobe signal 125 relative to the internal clock signal 121 achieved by the second step of the training operation. In this third set of sampling operations, control circuit 103, starting with delay values on the data bit signals on data bus 123 and data strobe signal 125 that are based on the results of steps one and two, again requests the known data pattern (or in other embodiments, a different known data pattern), and increments a respective delay on each data bit signal on data bus 123 from a starting delay value and ending with a final delay value. Sample values for the third set of sampling operations are generated and saved. Delay values for the data bit signals on data bus 123 and data strobe signal 125 may be adjusted based on the results of the third set of sampling operations.

Once the training operation is complete, control circuit 103, during an operational phase, may be configured to use the delays based on the first and second timing relationships (and third timing relationship if performed) to sample data from the second device on the data bus. Use of the training operation to determine delay values for the data bit signals on data bus 123 and data strobe signal 125 may compensate for clock jitter and signal skew due to timing non-idealities. This compensation may, in some embodiments, result in reduced bit error rates on data received via data bus 123 and/or may allow use of an increased transfer rate as compared to implementations in which the training operation is omitted.

Figure 2:
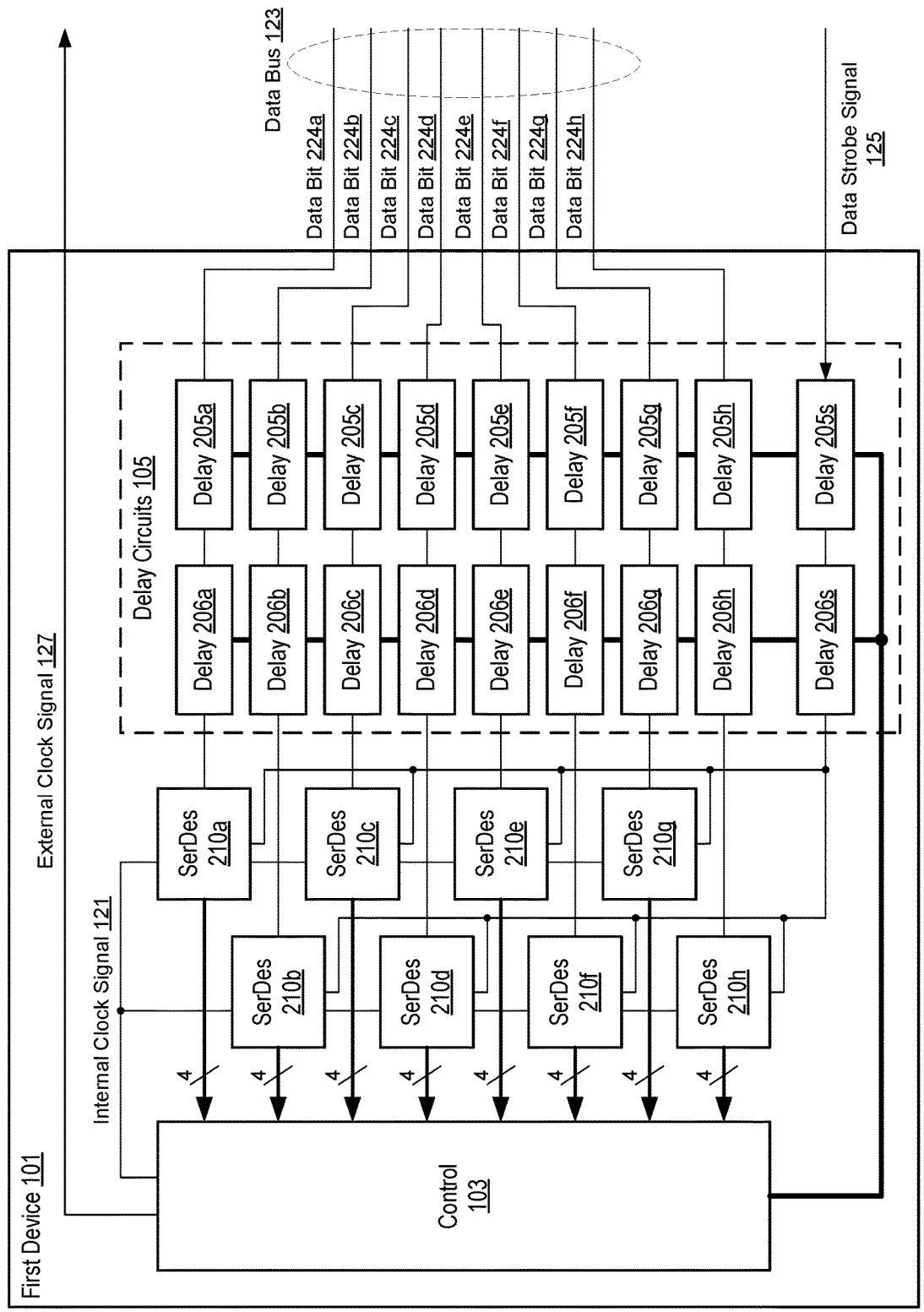
FIG. 2 is a generalized block diagram showing an embodiment of a data receiver circuit.

FIG. 1 and the corresponding description illustrate one embodiment of a device using a multichannel communication interface. The embodiment of FIG. 1 is a broad overview of a disclosed system. Various implementations of first device 101 may include different circuits for implementing the described training operation. Turning to FIG. 2, for example, a more detailed view of an embodiment of first device 101 is shown.

As shown in FIG. 2, first device 101 includes control circuit 103 and delay circuits 105. Delay circuits 105 include delay circuits 205a-205h and 206a-206h, as well as delay circuits 205s and 206s (collectively referred to as delay circuits 205 and delay circuits 206). First device 101 further includes serializer/deserializer (SerDes) circuits 210a-210h, coupled between delay circuits 206a-206h and control circuit 103. Control circuit 103 sends internal clock signal 121 to SerDes circuits 210a-210h and external clock signal 127 to second device 110. Additionally, clock signals 121 and 127 may or may not have a predetermined relative phase offset. Delay circuits 205a-205h each receive a respective one of data bit signals 224a-224h from second device 110. Delay circuit 205s receives data strobe signal 125 from second device 110.

As described above, first device 101 is configured to communicate with second device 110 using data bus 123. As shown in FIG. 2, control circuit 103 sends external clock signal 127 to second device 110, which then uses external clock signal 127 to establish timing for exchanging data with first device 101 over data bus 123. When sending data to first device 101, second device 110 asserts a value for a byte of data on data bus 123 and generates a transition on data strobe signal 125. Data bus 123 includes a plurality of data bit signals 224a-224h. First device 101 receives data strobe signal 125 and, in response to the transition, causes each of SerDes circuits 210a-210h to sample a respective value on each of data bit signals 224a-224h.

Two delay circuits are included between each of SerDes circuits 210a-210h and a respective data bit signal 224a-224h. Using the training operation disclosed above, each of delay circuits 205a-205h and 206a-206h may be set by control circuit 103 to particular values to compensate for non-idealities that may cause skew or jitter in the signal paths between second device 110 and first device 101, such that all eight data bit signals 224a-224h have a common data valid window when they arrive at their respective SerDes circuits 210a-210h. Similarly, delay circuits 205s and 206s are included between data strobe signal 125 and respective clock inputs to SerDes circuits 210a-210h allowing control circuit 103 to adjust the arrival time of transitions of data strobe signal 125 to coincide with the data valid window of data bit signals 224a-224h, thereby resulting in a valid value for the transmitted data byte to be sampled.

In various embodiments, each of delay circuits 205 and 206 may be a same design, or may vary between delay circuits 205 and delay circuits 206. Delay circuits 205 and 206 may be implemented using any suitable delay circuit design, such as inverter chains, biased inverters, switched impedance chains, and the like. In some embodiments, delay circuits 105 may include a combination of two or more delay circuit designs. In other embodiments, delay circuits 205 and 206 may be combined into a single delay circuit or broken up into more than two delay circuits. As illustrated, delay circuits 205 and 206 receive a digital value from control circuit 103, the digital value corresponding to an amount of delay to add to the propagation of a corresponding signal. For example, each of delay circuits 105 may accept a minimum value of zero, corresponding to effectively zero added delay, up to a maximum value of 31, corresponding to a maximum delay value. The maximum delay value may be selected by a designer based on a particular frequency to be used for internal clock signal 121. Including two such delay circuits on each received signal allows for total delay value to be set for each signal between 0 and 63, i.e., 64 distinct delays that may be independently set for each signal. The maximum total delay of the two delay circuits may, in some embodiments, span at least one period of internal clock signal 121, such that, for example, setting the total delay value to 63 results in a delay of at least 1 period of internal clock signal 121.

As illustrated, SerDes circuits 210a-210h are used to receive and sample respective data bit signals 224a-224h from respective delay circuits 206a-206h. In some embodiments, each of SerDes circuits 210a-210h samples its respective data bit signal 224a-224h at four points in time, based on four successive transitions (also referred to as "edges") of data strobe signal 125, generating four data bit values. The four data bit values are sent to control circuit 103 in parallel. The eight SerDes circuits 210a-210h can therefore generate eight 4-bit values in parallel, thereby creating a single 32-bit value to be received by control circuit 103. It is noted that this 32-bit value may, in various embodiments, correspond to a single 32-bit data word, or 32 individual data bits, or any suitable form in between.

By using these one-to-four SerDes circuits, control circuit 103 may receive and process data from data bus 123 at one fourth of the bit transfer rate of a single one of data bit signals 224a-224h. For example, if a bit transfer rate through each of data bit signals 224a-224h is 400 megabits per second (Mbps), then control circuit 103 receives a 4-bit nibble from each of SerDes circuits 210a-210b at a 100 mega-nibble per second rate, thereby allowing control circuit 103 to potentially use slower logic circuits for processing the received data than if the received data is processed at the data bus transfer rate.

It is noted that, as used herein, references to different data values being sent "in parallel" is in distinction to sending these values serially—i.e., one after the other. Data values sent in parallel thus overlap in time, and may all be sent, for example, based on a common trigger. Use of the term parallel is not, however, intended to imply that events (e.g., signal transitions or data valid windows) must begin and end at exactly the same points in time.

To perform a training operation, control circuit 103, in the first step, determines a first timing relationship between data strobe signal 125 and data bit signals 224a-224h on data bus 123. As described above, control circuit 103 requests a known data pattern to be sent by second device 110. To sample the known data pattern from data bus 123, control circuit 103 initializes all of delay circuits 105 to add zero delay to their respective signals. Starting with delay circuit 205s set to zero, SerDes circuits 210a-210h sample data bit signals 224a-224h one or more times (four times in the illustrated embodiment to generate a 4-bit nibble on each of SerDes circuits 210a-210h), and control circuit 103 saves each of the sampled values along with a value indicating the associated delay value used in delay circuit 205s for the samples. After the first samples are taken, control circuit 103 increments the delay value of delay circuit 205s (e.g., from zero to one) and takes another group of samples. This process is repeated until the delay value of delay circuit 205s reaches the maximum delay value (e.g., 31). The collected samples from this first set of sampling operations may be referred to as a first sample set, with each sample value corresponding to one 4-bit nibble sent by a respective one of SerDes circuits 210a-210h. As shown, eight sample values are taken for each increment of delay circuit 205s, one sample value for each of data bit signals 224a-224h.

To determine the first timing relationship, control circuit 103 is configured to determine a respective timing relationship between data strobe signal 125 and each of data bit signals 224a-224h to generate a plurality of data skew values, each data skew value corresponding to a respective one of data bit signals 224a-224h. To determine a data skew value for a particular one of data bit signals 224a-224h, control circuit 103 reads the first set of sample values that correspond to the particular data bit signal (e.g., data bit signal 224a) and identifies a series of passing sample values that correspond to consecutive increments of delay circuit 205s. The delay values corresponding to the consecutive increments of delay circuit 205s are referred to as a data valid window. If more than one data valid window is identified for data bit signal 224a, then a longest data valid window is used in the following steps.

A passing value is based on the known data pattern. In some embodiments, more than one passing value may be considered for a single data pattern. Additional details will be presented below regarding the known data pattern and its associated acceptable passing values.

A data skew value for data bit signal 224a is based on the identified data valid window. For example, in some embodiments, the data skew value may be set to a midpoint of the data valid window to, for example, provide margin to compensate for jitter between data bit signal 224a and data strobe signal 125. In other embodiments, the data skew value may be set to another part of the data valid window. For example, if a particular implementation of SerDes circuit 210a has a longer setup time than hold time, then the data skew value may be set later in the data valid window to increase the setup time of data bit signal 224a.

Control circuit 103 may select a maximum data skew value from the plurality of data skew values and sets delay circuit 205s based on the maximum data skew value. After a data skew value has been determined for each of data bit signals 224a-224h, control circuit 103 determines a maximum data skew value from these eight data skew values. The delay value for delay circuit 205s may be set to this maximum data skew value, thereby aligning data strobe signal 125 to the slowest of the data bit signals 224a-224h. To compensate for skew between the slowest data bit signal and the other data bit signals, delay values for delay circuits 205a-205h may be set based on a difference between the maximum data skew value and a data skew value corresponding to each of the data bit signals 224a-224h. The goal of the first step is to align data strobe signal 125 to transition in the middle of a valid data window for all of the data bit signals on data bus 123. Since delay circuits 205 can only increase delay times of their respective signals, data strobe signal 125 is aligned to the data valid window for the slowest data bit signal. The remaining data bit signals are then delayed such that their respective data valid windows are centered around data strobe signal 125. This completes the first step of the training operation.

In a second step of the training operation, control circuit 103 determines, using a second set of sampling operations, a second timing relationship of data bit signals 224a-224h on data bus 123 and data strobe signal 125 relative to internal clock signal 121. To perform the second set of sampling operations, delay values for delay circuits 205 remain at their first step values and delay values for delay circuits 206 begin at zero. Control circuit 103 requests the known pattern (or a different pattern in some embodiments) to be sent by second device 110. Four samples of each of data bit signals 224a-224h are taken based on the delayed transitions of data strobe signal 125, resulting in each of SerDes circuits 210a-210h generating a respective 4-bit nibble as a sample value. The group of sample values is saved including a corresponding delay value indication associated with the samples. The delay value for each of delay circuits 206 is incremented and another group of samples is taken and saved. The process is completed when a maximum delay value is reached for delay circuits 206. The collected samples from this second set of sampling operations may be referred to as a second sample set.

To determine the second timing relationship, control circuit 103 determines if a same data pattern is received for the entire second sample set. If the entire second sample set has the same data pattern, then the delay value for all of delay circuits 206 may be set at a middle value between zero and the maximum value. Otherwise, control circuit 103 may determine a transition point based on when the second sample set transitions from a first data pattern to a second data pattern. If this transition point occurs later than the middle value, then the delay value for all of delay circuits 206 may be set to zero, and otherwise set to the maximum value. This may complete the second step of the training operation.

In some embodiments, the training operation may end after the second step and first device 101 may transition into an operational mode to exchange information with second device 110. In other embodiments, however, a third step may be included to redetermine, using the delays based on the first and second timing relationships for a third set of sampling operations, the first timing relationship between data strobe signal 125 and data bit signals 224a-h. The first step is completed before the timing relationship between data strobe signal 125 and internal clock signal 121 is determined in the second step. The timing between these two signals may, therefore, be at a less desirable setting during the first step when the timing relationship between data strobe signal 125 and data bit signals 224a-h is initially determined. Redetermining the first timing relationship between data strobe signal 125 and data bit signals 224a-h may result in data strobe signal 125 being positioned at a more desirable point within the data valid windows for data bit signals 224a-h. An algorithm for performing the third set of sampling operations is based on the result of the second step.

If the result of the second step resulted in using the zero delay or the midpoint delay value as the delay value for delay circuits 206, then the third step begins by initializing delay circuits 206a-206h to zero and requesting the known data pattern from second device 110. Groups of sample values are generated as described above, with delay values for delay circuits 206a-206h being incremented for each successive group of sample values. The third set of sampling operations ends when the maximum delay value is reached, resulting in a third sample set.

If, however, the result of the second step resulted in using the maximum possible value as the delay value for delay circuits 206, then delay circuits 206 are already at the maximum delay value and cannot be further delayed in the third step. Results from the first step, however, may be less than the maximum possible delay value for all of delay circuits 205a-h. The third step, therefore, begins with delay circuits 205a-205h and 206a-206h at their respective delay values from completing the first and second steps, and then requesting the known data pattern from second device 110. Groups of sample values are generated as described above, with delay values for delay circuits 205a-205h being incremented for each successive group of sample values until the delay values for any one of delay circuits 205a-205h reach its maximum value. The additional delay achieved on data bus 123, referred to herein as a "first additional delay," is based on a difference between the maximum delay value for delay circuits 205a-h and a largest delay value used for delay circuits 205a-h from the first step. For example, if the maximum possible delay value for delay circuits 205a-h is 31 and the largest delay value used for delay circuits 205a-h in the first step is 13, then the first additional delay achieved on data bus 123 is 18.

Once this first additional delay is achieved, additional samples are collected by decrementing the delay value for data strobe signal 125 instead of incrementing the delay value for data bit signals 224a-h. The delay value for delay circuit 206s (set at the maximum delay value at the start of the third step) is therefore decremented rather than incrementing the delay values for delay circuits 205a-205h. Additional sample groups are collected until the delay value of delay circuit 206s reaches a second end value that is based on the first additional delay achieved. This second end value is set to the larger of the first additional delay achieved and the midpoint between the minimum possible and maximum possible delay values of delay circuit 206s. For example, if the minimum possible delay value is 0, the maximum possible delay value is 31, and the first additional delay achieved is 18, then the second end value is set to 18 (since 18 is larger than 16). After a sample is taken with the delay value for delay circuit 206s set to 18, the third set of sampling operations is completed with a third sample set having been collected.

After the third sample set is collected, delay values for delay circuits 205a-205h are restored to their respective values from the first step and delay value for delay circuits 206 may be adjusted based on the results of the third sample set. It is noted that delay circuit 205s is not adjusted in the third step. It is also noted that the disclosed three step training operation is one example. Variations of this training operation are contemplated.

Control circuit 103 is described throughout the disclosure as performing many of the operations of the described training operations. It is noted that, in some embodiments, control circuit 103 may perform these operations using hardware circuits. In other embodiments, control circuit 103 may perform the operations using various combinations of hardware, software, and firmware.

In FIGS. 1 and 2, circuit blocks are shown and described for receiving information from a data bus as well as for training the receiver device to compensate for non-idealities that may result in clock jitter and skew between signals. Training operations may be used to de-skew a data bus relative to a data strobe signal, as well as de-skew the data bus and data strobe signal relative to a clock signal. Charts depicting aligned and misaligned signals are shown in FIG. 3.

Figure 3:
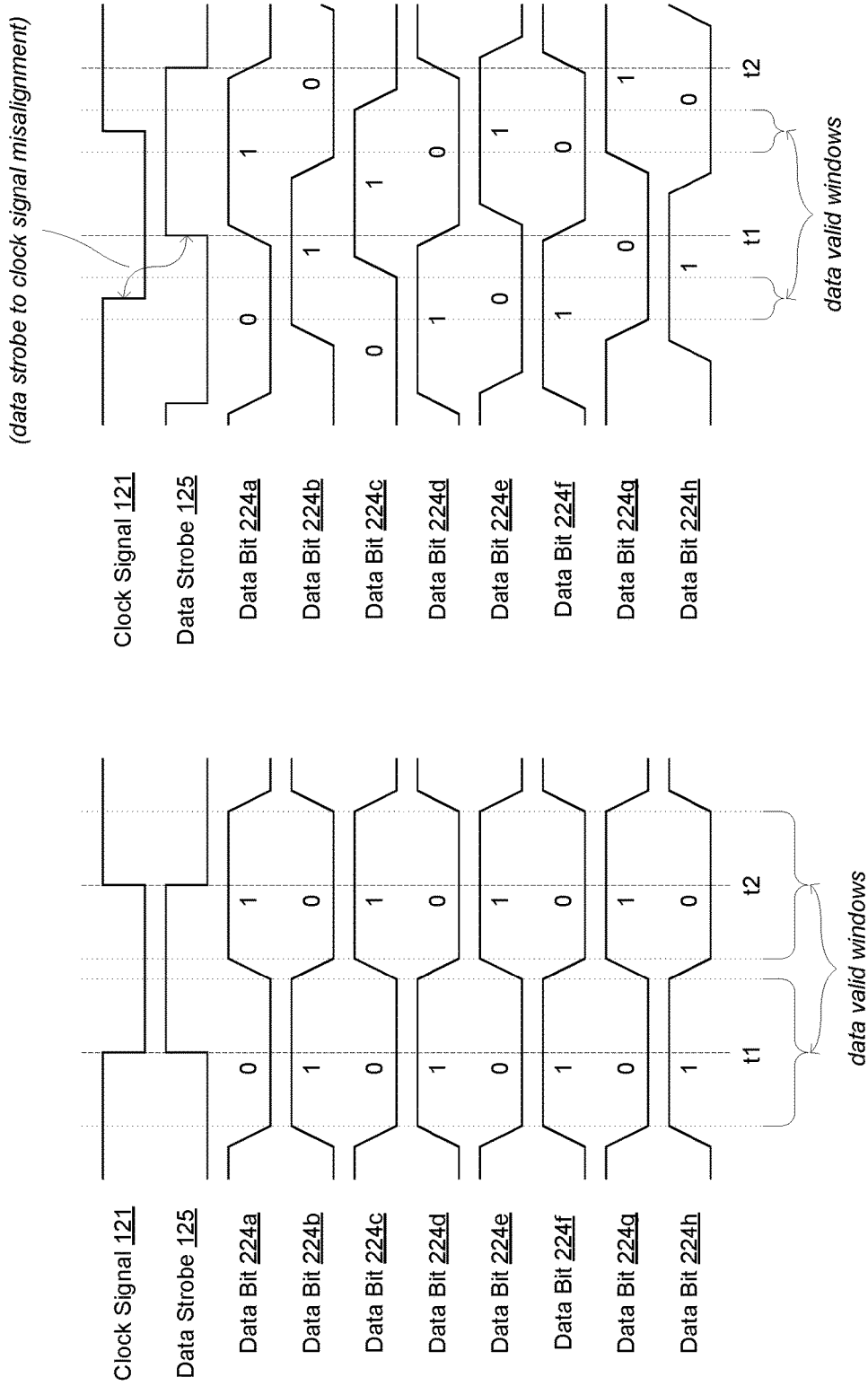
FIG. 3 depicts two timing diagrams illustrating waveforms for signals associated with an embodiment of a data receiver circuit.

FIG. 3 illustrates two charts that include internal clock signal 121, data strobe signal 125, and data bit signals 224a-224h. Chart 300 shows an example of aligned signals with a desired wide data valid window. A wide data valid window provides a greater tolerance for timing non-idealities. The width of a collective data valid window for all signals on data bus 123 is dependent on the relative timing of respective data valid windows for each of data bit signals 224a-h. Chart 310 depicts an example of skewed data bit signals that result in an undesired narrow collective data valid window. In both charts, the data being sent via data bit signals 224a-224h is 0xAA followed by 0x55, with data bit signal 224h representing the most significant bit (MSB) and data bit signal 224a representing the least significant bit (LSB). Data is sampled on both rising and falling transitions of data strobe signal 125.

Chart 300 shows an example of desired timing for the embodiment of FIG. 2. Internal clock signal 121 and data strobe signal 125 are 180 degrees out of phase. The desirability of this phase relationship will be explained below in the description of FIG. 4. Each of data bit signals 224a-224h is aligned with the other data bit signals, creating wide data valid window as indicated in FIG. 3. Data strobe signal 125 transitions at times t1 and t2, which are in the middle of the data bit valid windows. Having wide data valid window, as compared to chart 310, may make data reception more tolerant to occurrences of random jitter—that is, making data reception less likely to result in bit errors.

In contrast, chart 310 depicts an example of a skewed timing for the embodiment of FIG. 2. Data strobe signal 125 is misaligned to the desired 180 degree phase delay from internal clock signal 121. Data bit signals 224a-224h are skewed in relation to each other. As illustrated, data bit signal 224g is the last data bit signal to arrive, thereby forming the leading edge of the data valid windows. Data bit signal 224c is the earliest arriving data bit signal, thereby forming the trailing edge of the data valid windows. The resulting data valid windows are narrower than the data valid windows of chart 300. Transitions of data strobe signal 125 are shown (times t1 and t2) as occurring outside of the data valid window. As shown, sampling of data bit signal 224c would result in a bit error. Sampling of data bit signals 224a, 224d, and 224f may also result in bit errors. Even if timing of data strobe signal 125 is aligned to place transitions in the middle of the valid data windows, the narrow data valid window leaves less margin of error for jitter to occur on the illustrated signals as compared to the timing shown in chart 300. The training operations described herein attempt to realign timing of the illustrated signals to more closely approximate the timing shown in chart 300.

As disclosed above, it may be desirable to have data strobe signal 125 delayed 180 degrees out of phase with internal clock signal 121. In the illustrated embodiments, this is due to a design of SerDes circuits 210a-210h. An embodiment of a SerDes circuit 210 is illustrated in FIG. 4.

Figure 4:
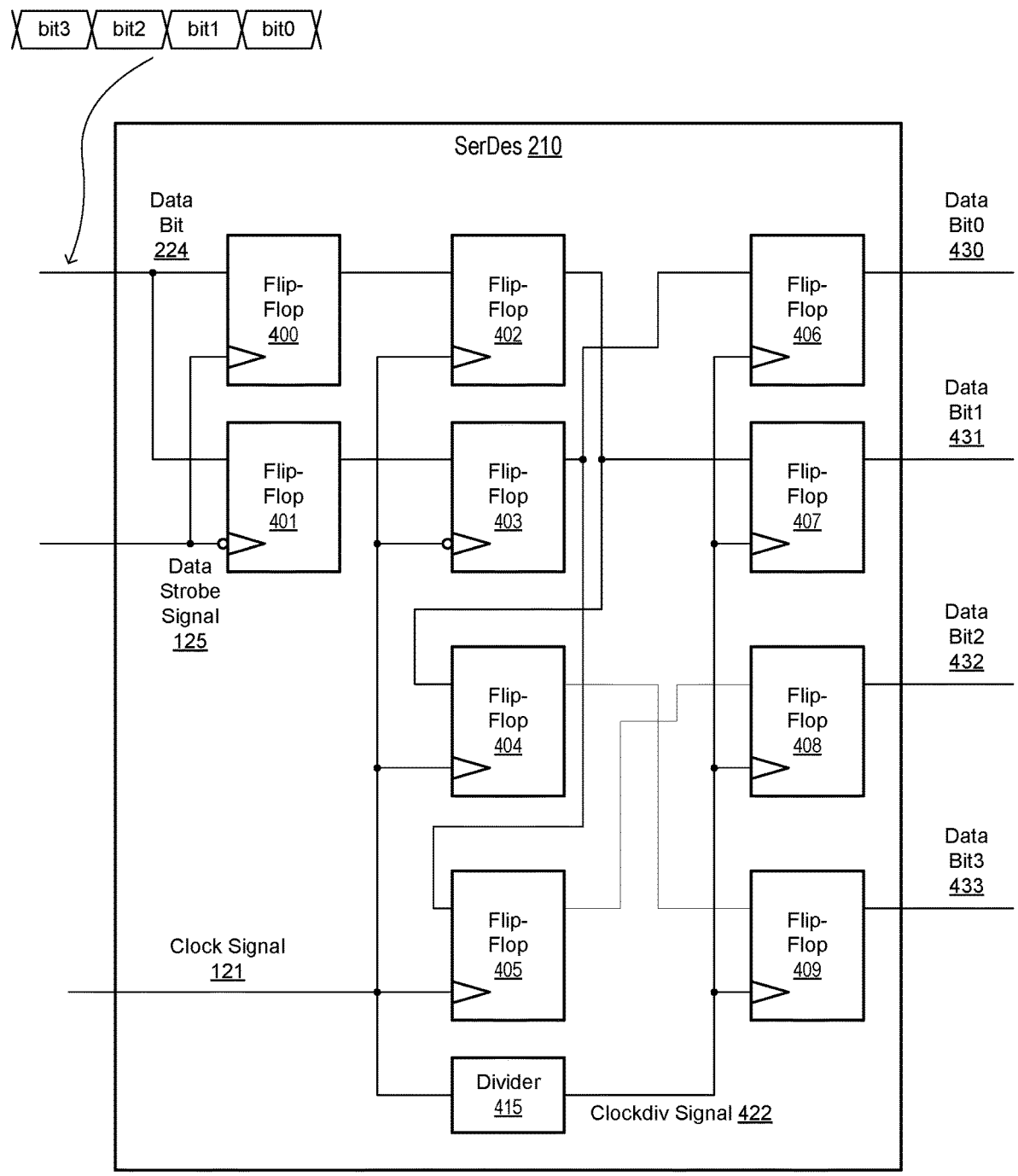
FIG. 4 illustrates a block diagram of an embodiment of a serializer-deserializer (SerDes) circuit.

Moving to FIG. 4, SerDes circuit 210 represents one possible implementation of SerDes circuits 210a-210h in FIG. 2. As shown, SerDes circuit 210 includes ten flip-flop circuits numbered 400-409. SerDes circuit 210 receives data bit signal 224 (representing a corresponding one of data bit signals 224a-224h), data strobe signal 125, and internal clock signal 121. Four data bit values that are received serially on data bit signal 224 are generated, in parallel, as output signals data bit0 430 through data bit3 433. Clockdiv signal 422 is shown as a version of internal clock signal 121 with a frequency that is divided down from the frequency of internal clock signal 121 using divider circuit 415. In some embodiments, an additional phase offset may be included between internal clock signal 121 and clockdiv signal 422.

As illustrated, the frequency of clockdiv signal 422 is one-half of the frequency of internal clock signal 121.

A "flip-flop circuit," or simply "flip-flop," refers to a circuit used to sample and store a value of a signal in response to a transition of a control signal. A flip-flop may capture a value or state on a signal line at a time when the control signal transitions from a low logic value to a high logic value, or vice versa. An output of the flip-flop is based on the most recent sampled value.

In some embodiments, SerDes circuit 210 may be implemented by using standard logic devices or by using a programmable logic device such as a field programmable gate array (FPGA). In other embodiments, SerDes circuit 210 may be implemented on an integrated circuit using custom logic circuits. As shown, SerDes circuit 210 receives the illustrated stream of four bits (bit3 first, then bit2, bit1, and bit0 last) on data bit signal 224. Using flip-flop circuits 400-409, these four data bits are sampled, latched, and then presented in parallel as data bit3 433-data bit0 430, respectively. The four-bit output of data bit3 433-data bit0 430 may be generated at one fourth of the frequency that data bits are sent serially on data bit signal 224. This lower frequency may allow circuits receiving data bit3 433-data bit0 430 to be implemented using slower logic circuits.

SerDes circuit 210, in the illustrated embodiment, samples incoming data bit signal 224 on both rising and falling transitions of data strobe signal 125 using flip-flops 400 and 401. Flip-flop 400 samples and latches bit values corresponding to data bit3 and data bit1 on rising transitions of data strobe signal 125. Flip-flop 401 samples and latches bit values corresponding to data bit2 and data bit0 on falling transitions of data strobe signal 125.

In operation, flip-flop 400 latches a value of data bit 3 on a rising transition of data strobe signal 125 and flip-flop 401 latches a value of data bit2 on a subsequent falling transition of data strobe signal 125. The latched value of flip-flop 400 (data bit3) is latched by flip-flop 402 on a rising transition of internal clock signal 121, while the latched value of flip-flop 401 (data bit 2) is latched by flip-flop 403 on a subsequent falling transition of internal clock signal 121. As previously disclosed, it may be desirable to set a timing relationship between internal clock signal 121 and data strobe signal 125 such that they have a 180 degree phase delay. In other words, rising transitions of internal clock signal 121 occur at substantially the same time as falling transitions of data strobe signal 125, and vice versa. This 180 degree phase delay allows a rising transition of internal clock signal 121 to cause flip-flop 402 to latch a most recent value of flip-flop 400 that is latched on a rising transition of data strobe signal 125. If rising transitions of internal clock signal 121 occur too soon after rising transitions of data strobe signal 125, then flip-flop 400 may not finish latching a new bit value, causing flip-flop 402 to latch a previous or indeterminate bit value. Similar timing concerns can impact flip-flops 401 and 403.

On a next rising transition of data strobe signal 125, flip-flop 400 latches a value for data bit 1, and flip-flop 401 latches a value for bit 0 on a subsequent falling transition of data strobe signal 125. On a next rising transition of internal clock signal 121, flip-flop 402 latches the value of data bit1 from flip-flop 400. In addition, flip-flops 404 and 405 latch the values of data bit3 and data bit2 from flip-flops 402 and 403, respectively. At the subsequent falling transition of internal clock signal 121, flip-flop 403 latches the value of data bit0 from flip-flop 401. At this point, flip-flops 402-405 have latched the values of data bit0-data bit3, respectively. Clockdiv signal 422 is generated such that a rising transition on clockdiv signal 422 occurs when the values of data bit0-data bit3 are latched in flip-flops 402-405, thereby latching these values in flip-flops 406-409, and generating signals data bit0 430-data bit3 433. Since all four of flip-flops 406-409 are clocked by rising transitions of clockdiv signal 422, data bit0 430-data bit3 433 may transition substantially in parallel, at a rate that is one-fourth the rate that data bits 0-3 are sent on data bit signal 224.

It is noted that divider circuit 415 is shown as being included within SerDes circuit 210. In other embodiments, divider circuit 415 may be included elsewhere in first device 101 and sent to all eight of SerDes circuits 210*a*-210*h*. It is also noted that other embodiments of SerDes circuit 210 are contemplated. In other embodiments, a different timing relationship between internal clock signal 121 and data strobe signal 125 may be desired. For example, if flip-flops 402, 404, and 405 are changed to respond to falling transitions of internal clock signal 121 and flip-flop 403 is changed to respond to a rising transition, then a zero degree delay between internal clock signal 121 and data strobe signal 125 may be desired.

The description of FIG. 4 discloses a possible implementation of a SerDes circuit and describes timing of signals used to sample a serial data input signal. A training operation may be used to modify the timing between the various signals to compensate for skew between these signals and to increase tolerance of the SerDes circuit to jitter on one or more of the signals. An example of a known data pattern for use with a training operation is presented in FIG. 5.

Figure 5:
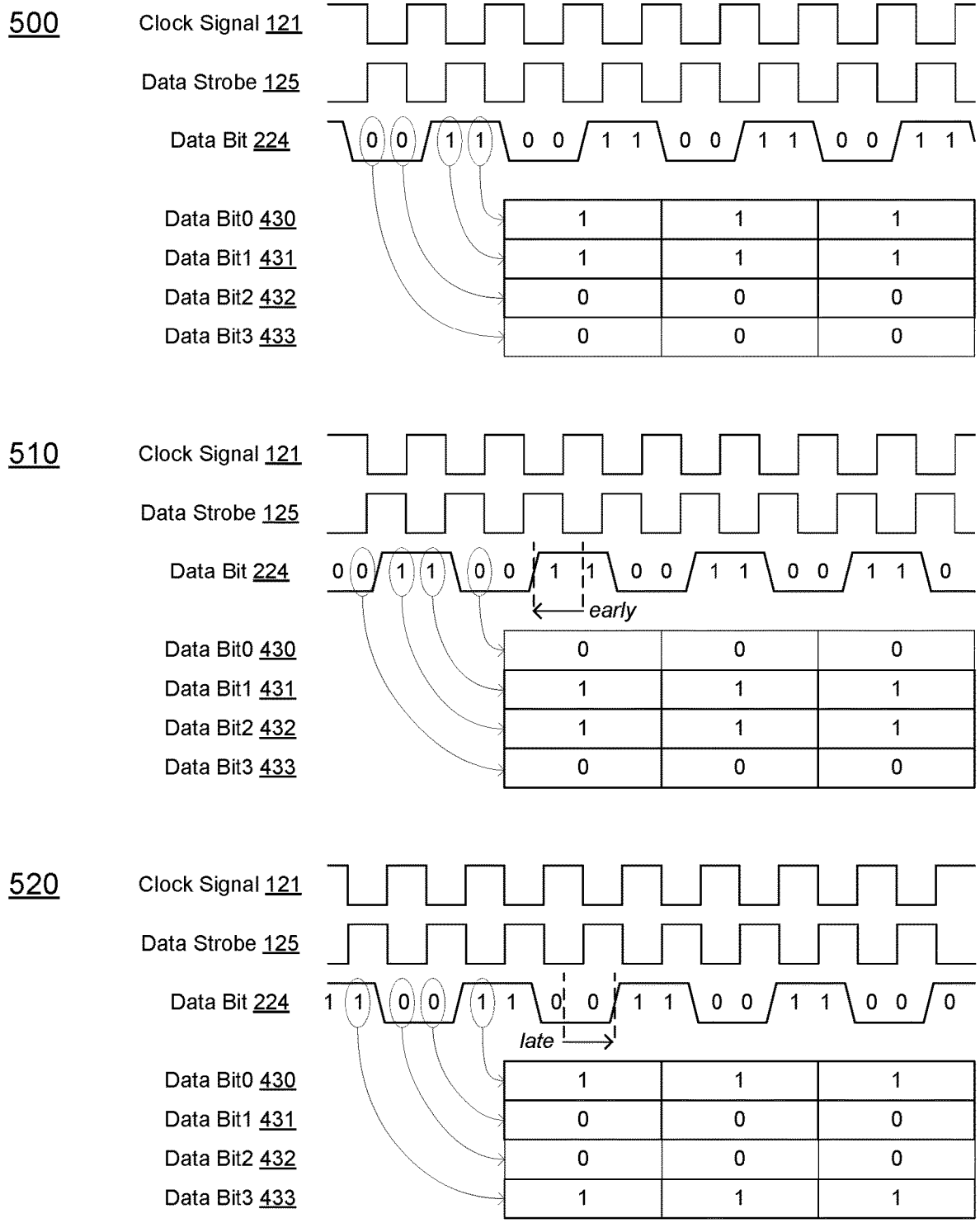
FIG. 5 shows three timing diagrams depicting waveforms for signals associated with an embodiment of a data receiver circuit.

Turning to FIG. 5, three charts are illustrated that depict an example of a training pattern and how serial data received by a SerDes circuit may change based on various amounts of skew between a data bit signal and a data strobe signal. All three charts include internal clock signal 121, data strobe signal 125, data bit signal 224 (representing any one of data bit signals 224*a*-224*h* in FIG. 2), and data bit0 430-data bit3 433 representing data bit values latched by flip-flops 406-409 in FIG. 4. Chart 500 depicts an example of a de-skewed system with desired timing between data strobe signal 125 and data bit signal 224. Chart 510 shows an example in which transitions of data bit signal 224 occur earlier than transitions of data strobe signal 125, also referred to herein as data bit signal 224 leading data strobe signal 125. Chart 520 illustrates the opposite condition, when transitions of data bit signal 224 occur later than transitions of data strobe signal 125, also referred to herein as data bit signal 224 lagging data strobe signal 125. Internal clock signal 121 and data strobe signal 125 are shown with a desired 180 degree phase delay to focus on the data strobe signal to data bit signal skew. In addition, a single data bit signal is shown for clarity.

As shown, a known data pattern is sent by second device 110 in FIG. 1 via data bit signal 224. The known data pattern in this example is 0b0011 (0x3). A value of 0b0011 may also be referred to as a half-rate pattern as transitions occur on data bit signal 224 for every other bit value, in this case between bit2 and bit1, and between bit 0 and a subsequent bit3. Using this half-rate pattern may, in some embodiments, simplify identification of data valid windows. Other known data patterns may be used as half-rate patterns, such as 0b1100, 0b0110, and 0b1001.

Chart 500 illustrates a device in which a desired timing relationship has been set and the latched data of data bit3 433-data bit0 430 matches the known data pattern. As shown, transitions of data strobe signal 125 occur close to the center of each data bit valid time on data bit signal 224. These bit values are latched as described for SerDes circuit 210 in FIG. 4.

Chart 510 shows data bit signal 224 leading data strobe signal 125 (as shown by the "early" arrow). Because of the early arrival of data bit signal 224, SerDes circuit 210 latches a value of 0b0110 instead of the expected value of 0b0011. Conversely, Chart 520 shows data bit signal 224 lagging data strobe signal 125 (as shown by the "late" arrow). Because of the late arrival of data bit signal 224, a value of 0b1001 is latched in SerDes circuit 210 instead of the expected value of 0b0011.

During a set of sampling operations, second device 110 may repeatedly send the 0b0011 known data pattern while control circuit 103 increments delay circuit 205*s* from an initial delay value to a final delay value. For each increment, four data bits are sampled on data bit signal 224 to generate a four bit value that includes data bit3 433-data bit0 430. This four-bit value may be stored along with an indication of the corresponding delay value. Control circuit 103 reviews the stored samples and may look for a data valid window, e.g., a longest consecutive series of samples that equal the known data pattern, 0b0011. A delay value for delay circuit 205*s* and/or a corresponding one of delay circuits 205*a*-205*h* may be set based on this data valid window.

The charts of FIG. 5 illustrate how skew between data strobe signal 125 and data bit signal 224 may result in incorrect data values being sampled by SerDes circuit 210. Alignment of clockdiv signal 422 shown in FIG. 4 with data strobe signal 125 may also result in a different pattern from the known data pattern being sampled and latched. An example illustrating alignment of clockdiv signal 422 with data strobe signal 125 is shown in FIG. 6.

Figure 6:
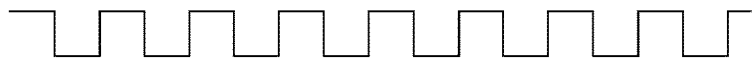
FIG. 6 depicts two timing diagrams illustrating waveforms for signals associated with an embodiment of a data receiver circuit.
Figure 6:
Figure 6:
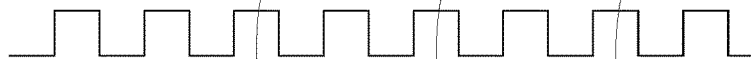
Figure 6:
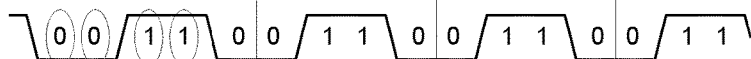
Figure 6:
Figure 6:
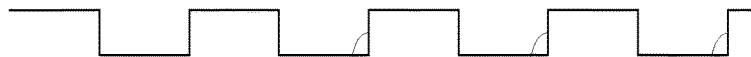
Figure 6:
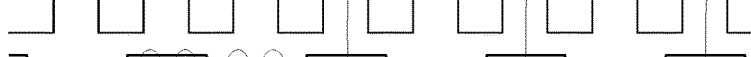
Figure 6:

Proceeding to FIG. 6, two charts are shown that illustrate a relationship between clockdiv signal 422 and data strobe signal 125. The two charts in FIG. 6 include the same signals as shown in the charts 500, 510, and 520 in FIG. 5. In addition, clockdiv signal 422 is also shown on both charts. As described above, clockdiv signal 422 is a version of internal clock signal 121 with a frequency that is divided by two and may include an additional phase offset. As shown, clockdiv signal 422 transitions on each rising transition of internal clock signal 121.

As illustrated, second device 110 from FIG. 1 again sends a known data pattern that includes repeatedly sending a value of 0b0011 on data bit signal 224. In both chart 600 and 610, data strobe signal 125 is aligned to sample data bit signal 224 in the middle of a valid data window, and data strobe signal 125 is 180 degrees out of phase with internal clock signal 121. Referring to FIG. 4, data strobe signal 125 correctly samples data bit signal 224 and flip-flops 400 and 401 latch the sampled values. Internal clock signal 121 causes flip-flops 402 and 403 to correctly latch the values from flip-flops 400 and 401, and cause flip-flops 404 and 405 to shift the previous values from flip-flops 402 and 403. On alternating rising transition of internal clock signal 121, flip-flops 402-405 latch the correct known data pattern, which is bit3 in flip-flop 404, bit2 in flip-flop 405, bit1 in flip-flop 402, and bit0 in flip-flop 403. On the other alternating rising transitions of internal clock signal 121, flip-flops 402 and 403 latch bit3 and bit2 of a current transmission of the known data pattern. Flip-flops 404 and 405, however, latch the value of bit1 and bit0 from the previous transmission of the known data pattern.

Chart 600 depicts conditions when data strobe signal 125 has a desired alignment with clockdiv signal 422. Rising transitions of clockdiv signal 422 are aligned with the alternating rising transitions of internal clock signal 121, when flip-flops 402-405 have latched a current value of the known data pattern. The rising transition of clockdiv signal 422 results in the known data pattern of 0b0011 being latched on to data bit3 433-data bit0 430. In contrast, chart 610 illustrates when data strobe signal 125 is misaligned with clockdiv signal 422. In this case, rising transitions of clockdiv signal 422 are aligned with the other alternating rising transitions of internal clock signal 121, when flip-flops 402-405 have latched a portion of the current value of the known data pattern and a portion of the previous value. Since data pattern repeats, the rising transition of clockdiv signal 422 results in a data pattern of bit1, bit0, bit3, bit2 (0b1100) being latched on to data bit3 433-data bit0 430. In other words, bits 1 and 0 are swapped with bits 3 and 2.

During a training operation, alignment of clockdiv signal 422 and data strobe signal 125 may not be known. Even when internal clock signal 121 and data strobe signal 125 are aligned with the desired 180 degree phase shift, clockdiv signal 422 and data strobe signal 125 may be shifted by an entire period of data strobe signal 125. Correcting a phase shift of an entire period of data strobe signal 125 may increase complexity of the training circuitry. Such an increase in complexity may result in an increase to the circuit size as well as potential increases to power consumption, either of which may be unacceptable in some embodiments. In such embodiments, rather than attempting to correct the misalignment, the two sample values may be accepted as passing, the actual known data pattern and a data pattern with data bits 1 and 0 swapped with data bits 3 and 2. In the examples used herein, the two passing values are 0b0011 and 0b1100, as shown in FIG. 6. In these embodiments, control circuit 103 may detect the misalignment between clockdiv signal 422 and data strobe signal 125 based on which of the two passing values are sampled during the training operation. Control circuit 103 may then rearrange the sampled data bits into a proper order when the misalignment is detected.

Figure 7:
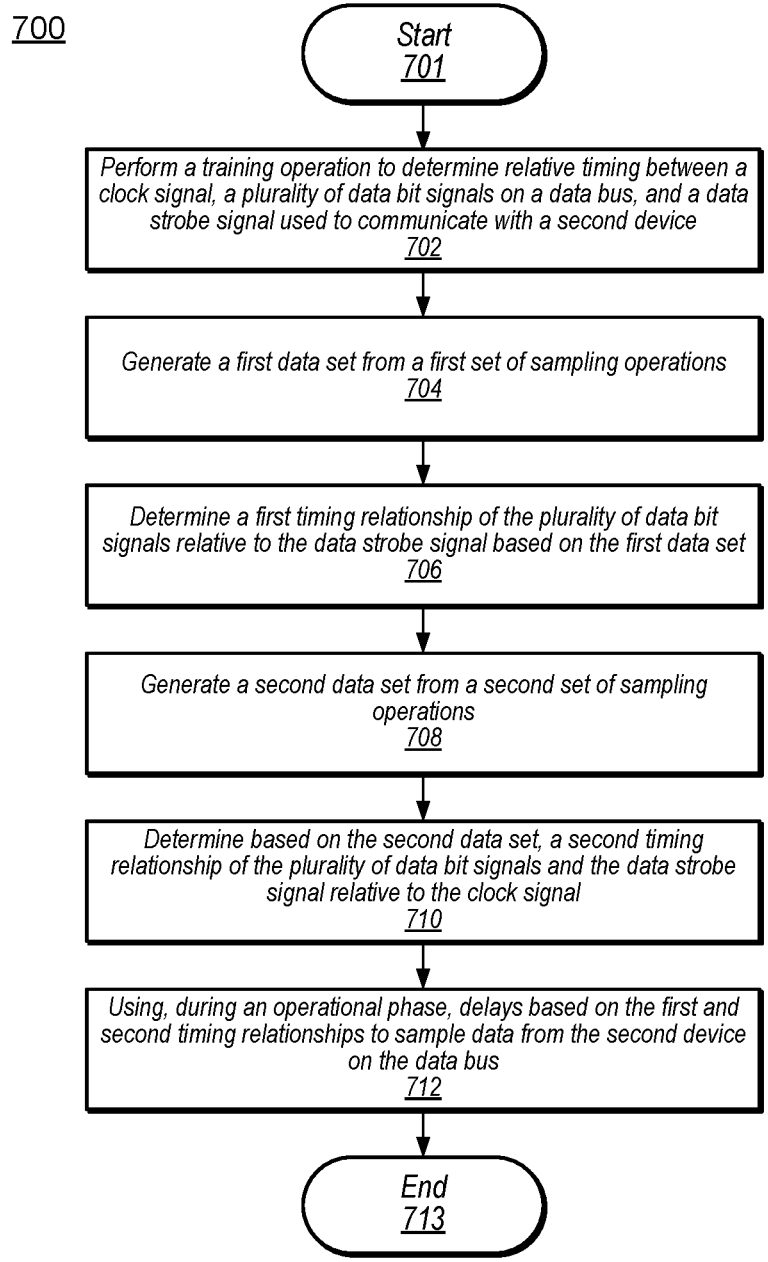
FIG. 7 illustrates a flow diagram of a method for performing a training operation on a data receiver circuit.

The waveforms shown in FIGS. 5 and 6 depict possible behavior for signals during operation of embodiments of first device 101. These waveforms may be generated during a training operation for first device 101. Various methods may be employed when performing a training operation on first device 101. FIG. 7 illustrates one such method.

Turning to FIG. 7, a flow diagram of a method for performing a training operation on an embodiment of a data bus receiver circuit is shown. Method 700 may be applied to first device 101 to perform a training operation to compensate for non-idealities in the circuits and connections included in a data bus interface between first device 101 and second device 110. Completion of method 700 may result in a reduced bit error rate when first device 101 receives data from second device 110. Referring to first device 101 in FIGS. 1 and 2 and to the flowchart of FIG. 7, method 700 begins in block 701.

A first device performs a training operation to determine relative timing between a clock signal, a plurality of data bit signals on a data bus, and a data strobe signal used to communicate with a second device (block 702). The training operation may be initiated in response to a particular event, such as a power-on of first device 101, a system reset of first device 101, or a determination that a bit error rate on the data bus has reached a threshold level. The training operation may also, in some embodiments, be initiated periodically to maintain a bit error rate below the threshold level.

The first device generates a first data set from a first set of sampling operations (block 704). As a part of a first step of the training operation, control circuit 103 in first device 101 requests second device 110 to send a particular data pattern to first device 101 using data bus 123. As illustrated, the particular data pattern is known to first device 101 and may, in some embodiments, be a half-rate data pattern that results in, for example, a repeating series of 0b0011 being transmitted on each of data bit signals 224a-224h. In other embodiments, other suitable data patterns may be utilized, such as a repeating series of 0b1001.

Delay circuits 205 and 206 are set to an initial delay value, such as zero, for all data bit signals 224a-224h as well as data strobe signal 125. As shown, after each transmission of the four-bit data pattern, the delay value for delay circuit 205s is incremented, while the remaining delay circuits 205 and 206 remain at the initial delay value. This incrementing results in a sampling point for SerDes circuits 210a-210h being swept from the initial delay value to a final delay value. After each four-bit transmission, a four-bit data value is sampled by each of SerDes circuits 210a-210h based on a respective data bit signal 224a-224h. In some embodiments, the sampled data values may be saved, along with an indication of the corresponding delay value for delay circuit 205s. In other embodiments, rather than saving the sampled value, an indication of the sampled value equaling a passing value or a failing value is saved with the delay value indication. As previously disclosed, two or more sample values may be accepted in this first step as a passing value. In the illustrated embodiment, values of 0b0011 or 0b1100 may be accepted as passing, while all other values are considered failing. The saved values or indications form the first data set.

The first device determines a first timing relationship of the plurality of data bit signals relative to the data strobe signal based on the first data set (block 706). A variety of algorithms may be used to determine the timing relationship between the signals of data bus 123 and data strobe signal 125. As illustrated, control circuit 103 identifies a longest data valid window and a midpoint time for each data valid window associated with a respective one of data bit signals 224a-224h. Control circuit 103 identifies a maximum one of the eight data valid window midpoint times in the illustrated example. Control circuit 103 then sets the delay value for each of delay circuits 205a-205h to a value corresponding to the identified maximum data valid window midpoint time minus the data valid window midpoint time for the respective one of data bit signals 224a-224h. The delay value for delay circuit 205s is set corresponding to the maximum data valid window midpoint time, thereby aligning data strobe signal 125 to the midpoint of the latest data valid windows for each of data bit signals 224a-224h. This may complete the first step of the training operation.

The first device generates a second data set from a second set of sampling operations (block 708). In various embodiments, second device 110 may continue to send the same known data pattern or control circuit 103 may request a different known data pattern for this second step of the training operation. As shown, delay values for delay circuits 205 retain the delay values set in the first step of the training operation. Delay values for delay circuits 206 start at their respective initial delay values, such as zero. After each transmission of the four-bit data pattern, the delay value for delay circuits 206 are incremented by the same amount, while delay circuits 205 remain at the delay values from the first step. This results in data bit signals 224a-224h and data strobe signal 125 being swept in unison from the initial delay value to a final delay value in relation to internal clock signal 121.

After each four-bit transmission of the known data pattern, the four-bit data value is sampled by each of SerDes circuits 210a-210h. Similar to the description for the first step, the sampled data values may be saved in some embodiments. In other embodiments, an indication that the sampled value equals one of one or more expected values or a different value is saved. The saved values or indications form the second data set.

The first device determines, based on the second data set, a second timing relationship of the plurality of data bit signals and the data strobe signal relative to the clock signal (block 710). As with the first step, a variety of algorithms may be used to determine the timing relationship between the data bus and data strobe signals to the clock signal. In various cases, a variety of results may be possible. In the illustrated embodiment, a first possibility is that all samples result in a same expected data pattern being sampled for the range of delay values used in the second step. In this case, the delay values for each of delay circuits 206 are set to a midpoint between the initial delay value and the final delay value. A second possible result is that a transition occurs from receiving a first expected data value to receiving a second expected data value, with one or more occurrences of a different value between the two expected values. In this case, the delay values for each of delay circuits 206 are based on when the transition occurs. If the transition occurs between the initial delay value and the middle of the sweep range, then the delay values for each of delay circuits 206 are set to the final delay value. A third possible result is that the transition occurs at a point from the middle of the sweep range to the final delay value. In the case of the third result, the delay values for each of delay circuits 206 are set to the initial delay value. If the results do not fall into one of these three possible results, then the second step has failed and the training operation may be restarted at the first step. Otherwise, once the delay values for delay circuits 206 have been set, then the second step is complete and the training operation may be finished. In other embodiments, a third step may be performed as described below in regards to FIG. 8.

The first device uses, during an operational phase, delays based on the first and second timing relationships to sample data from the second device on the data bus (block 712). After the training operation has been completed, then first device 101 may use data bus 123 to exchange data with second device 110. The timing delays set by the training operation may reduce a bit error rate when receiving data from second device 110 via data bus 123 and/or may enable higher data rates to be employed, thereby improving performance of the system. The method ends in block 713.

As disclosed, method 700 may, in some embodiments, include a third step. In the first step of the training operation, the timing between data strobe signal 125 and internal clock signal 121 may have been at a less desirable setting. This third step includes redetermining the timing relationship between data strobe signal 125 and each of data bit signals 224a-224h with the timing of data strobe signal 125 set to a more desirable point based on the results of the first and second steps of the training operation.

Figure 8:
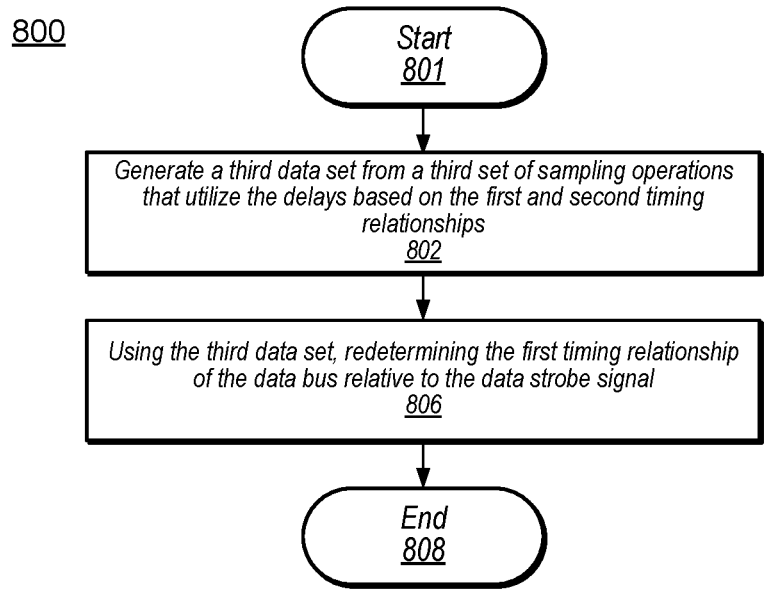
FIG. 8 is flow diagram showing a method for performing a third step in a training operation.

Moving to FIG. 8, a flow diagram of a method for performing a third step of a training operation on an embodiment of a data bus receiver circuit is shown. Method 800 may, like method 700, be applied to first device 101 during a training operation to improve performance in a data bus interface between first device 101 and second device 110. Referring to first device 101 in FIGS. 1 and 2, and to the flowchart FIG. 8, method 800 begins in block 801 after block 710 of method 700 has finished.

The first device generates a third data set from a third set of sampling operations that utilize the delays based on the first and second timing relationships (block 802). This third data set is used to redetermine the timing relationship between data strobe signal 125 and each of data bit signals 224a-224h. As stated above, a variety of algorithms may be used to determine the timing relationship between the signals of data bus 123 and data strobe signal 125. As illustrated, control circuit 103 requests second device 110 to send a known data pattern. In some embodiments, second device 110 may send the same known data pattern beginning with the first step described above and continue sending this data pattern until this third step completes. In other embodiments, control circuit 103 may request that second device 110 starts and stops the known data pattern for each step. The known data pattern may or may not remain the same for all three steps.

Control circuit 103 initializes delay values for delay circuits 206a-206h based on the results of the second step in method 700. If the delay values for delay circuits 206 are set to the initial delay value (also referred to as the first case) or the midpoint between the initial delay value and the final delay value (the second case), then the delay values for delay circuits 206a-206h are set to the initial delay value. Otherwise, if the delay values for delay circuits 206 are set to the final delay value (the third case), then the delay values for delay circuits 206a-206h remain set to the final delay value. In all three cases, the delay values for delay circuits 205a-205h remain at the delay values from the first step. It is noted that delay values for delay circuits 205s and 206s remain at the values set at the end of the second step, except as described below.

Referring to the first and second cases, after each transmission of the four-bit data pattern, the delay value for delay circuits 206a-206h are incremented by the same amount, while delay circuits 205 remain at the delay values from the first step and delay circuit 206s remain at the delay value from the second step. This incrementing results in data bit signals 224a-224h being swept from the initial delay value to a final delay value in relation to data strobe signal 125.

Referring to the third case, a delay stop value is determined for based on the results of the first step of the training operation. For example, a delay stop value may be determined based on a difference between the maximum delay value for delay circuits 205a-h and a largest delay value used for delay circuits 205a-h from the first step. The reason for using delay circuits 205a-205h rather than delay circuits 206a-206h is that the delay values for delay circuits 206a-206h have already been set to the maximum value, i.e., the final delay value. Therefore, the third case "borrows" additional delay time from delay circuits 205a-205h. The delay stop value is used to effectively preserve the delay times from the second step. In the third case, after each transmission of the four-bit data pattern, the delay value for delay circuits 205a-205h are incremented by the same amount, while delay circuits 206 remain at the delay values from the second step. Data bit signals 224a-224h are swept, relative to data strobe signal 125, from the delay values from the first step until any one of delay circuits 205a-205h reaches its maximum value. When one of delay circuits 205a-205h reaches its maximum value, the delay value for delay circuit 206s is then decremented from its initial delay value to the delay stop value.

For all three cases, four-bit values sampled by SerDes circuits 210a-210h are received and control circuit 103 saves either the four-bit values or indications if the four-bit values correspond to one of the passing values or a different value. The saved values or indications form the third data set.

Using the third data set, the first device redetermines the first timing relationship of the data bus relative to the data strobe signal (block 806). Expected results for the third data set may depend on which of the three cases occurs in block 802. If the first case occurs, then a transition from a first passing data value to a second passing data value is expected. Control circuit 103 determines delay values for delay circuits 206, including delay circuit 206s, based on the transition point from the first to second passing values. Delay values for delay circuits 205 remain set to the values from the first step of the training operation.

If the second case occurs, then one of the passing values is expected to have a large data valid window in the third data set. Control circuit 103 determines delay values for delay circuits 206a-206h based on a midpoint of this data valid window. Delay values for delay circuits 205 and delay circuit 206s remain set to the values from the first and second steps of the training operation.

If the third case occurs, then a transition from a first passing data value to a second passing data value is again expected. Control circuit 103 determines delay values for delay circuits 206 based on the transition point from the first to second passing values. Delay values for delay circuits 205a-205h are returned to the values set in the first step. It is noted that the delay value for delay circuit 205s remains unchanged in the third step of the training operation. The training operation may now be completed and the method ends in block 808.

As disclosed above various algorithms may be used to determine the delay times for the plurality of delay circuits included in the first device. A variation of methods 700 and 800 is considered below in method 900 shown in FIG. 9. Some operations of method 900 are similar to operations described above for methods 700 and 800, but are described in more generalized terms.

Figure 9:
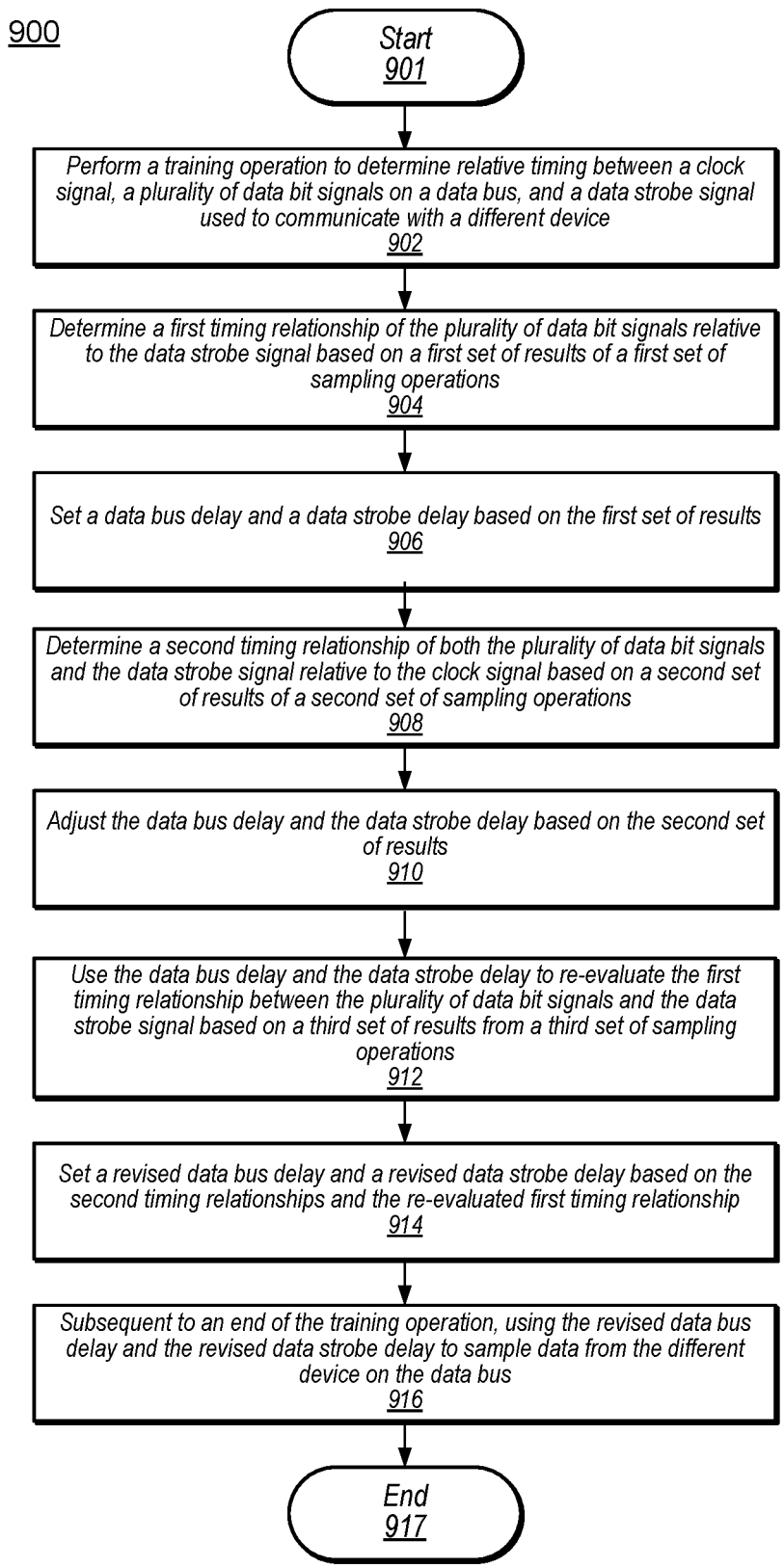
FIG. 9 depicts a flow diagram of another method for performing a training operation on a data receiver circuit.

Proceeding to FIG. 9, a flow diagram of another method for performing a training operation on an embodiment of a data bus receiver circuit is illustrated. Similar to methods 700 and 800, method 900 may be applied to first device 101 to perform a training operation to improve timing on a data bus interface between first device 101 and second device 110. Completion of method 900 may enable a reduced bit error rate and/or increased performance when first device 101 receives data from second device 110. Referring to first device 101 in FIGS. 1 and 2, and to the flowchart FIG. 9, method 900 begins in block 901.

A computer system performs a training operation to determine relative timing between a clock signal, a plurality of data bit signals on a data bus, and a data strobe signal used to communicate with a different device (block 902). In the present example, the computer system includes first device 101. The computer system may execute one or more program instructions that initiate the training operation, including causing control circuit 103 to perform some or all of the steps of method 900. As described for block 702 in FIG. 7, the training operation may be initiated for a variety of reasons.

The computer system determines a first timing relationship of the plurality of data bit signals relative to the data strobe signal based on a first set of results of a first set of sampling operations (block 904). As described above, non-idealities in circuits, wires, cables, and the like may cause skew between data strobe signal 125 and each of data bit signals 224a-224h. To identify the various amounts of skew, the computer system performs a data de-skew step of the training operation that includes performing the first set of sampling operations as described above in block 704 of FIG. 7. The computer system generates the first set of results based on identified data valid windows for each of data bit signals 224a-224h.

The computer system sets a data bus delay and a data strobe delay based on the first set of results (block 906). Using the first set of results, the computer system determines an amount of skew between data strobe signal 125 and each of data bit signals 224a-224h. Based on the determined skew amounts, the computer system adjusts delay values for delay circuits 205, as described in block 706 of method 700. The data de-skew step of the training operation is complete.

The computer system determines a second timing relationship of both the plurality of data bit signals and the data strobe signal relative to the clock signal based on a second set of results of a second set of sampling operations (block 908). The non-idealities may also cause a phase shift between data strobe signal 125 and internal clock signal 121. The computer system identifies a phase shift by performing the second set of sampling operations as part of a phase shift step of the training operation. This second set of sampling operations is performed as described above in block 708 of method 700. As for the data de-skew step, the computer system generates the second set of results, based on identified data valid windows for each of data bit signals 224a-224h.

The computer system adjusts the data bus delay and the data strobe delay based on the second sets of results (block 910). Using the second set of results, the computer system determines a phase shift between data strobe signal 125 and internal clock signal 121. Based on the determined phase shift, the computer system adjusts delay values for delay circuits 206, as described in block 710 of method 700. The data phase shift step of the training operation is complete.

The computer system uses the data bus delay and the data strobe delay to re-evaluate the first timing relationship between the plurality of data bit signals and the data strobe signal based on a third set of results from a third set of sampling operations (block 912). In the data de-skew step, timing between data strobe signal 125 and internal clock signal 121 may be at a less desirable setting which, in turn, may result in less desirable settings for delays being determined in the data de-skew step. The third set of sampling operations may be performed to potentially improve timing between data strobe signal 125 and data bit signals 224a-224h. The computer system performs this second de-skew step of the training operation by performing sampling operations as described above in block 802 of FIG. 8. The computer system generates the third set of results based on identified data valid windows for each of data bit signals 224a-224h.

The computer system sets a revised data bus delay and a revised data strobe delay based on the second timing relationships and the re-evaluated first timing relationship (block 914). Using the third set of results, the computer system identifies if additional skew remains between data strobe signal 125 and each of data bit signals 224a-224h. Based on any identified skew, the computer system may revise delay values for delay circuits 205 and 206, as described in block 806 of method 800. The second de-skew step of the training operation is complete.

Subsequent to an end of the training operation, using a revised data bus delay and a revised data strobe delay to sample data from the different device on the data bus (block 916). After the training operation has completed, the computer system may use data bus 123 to exchange data with a different device, such as second device 110. The timing delays set by the training operation may reduce a bit error rate when receiving data via data bus 123 and/or may enable use of higher data rates, thereby improving performance of the system. The method ends in block 917.

As disclosed above, various processes and algorithms may be employed to perform a training operation on a data receiver circuit. The methods presented above include a two-step method with an optional second de-skew step to refine results of the data de-skew step. A different method is disclosed below in regards to FIGS. 10 and 11.

Figure 10:
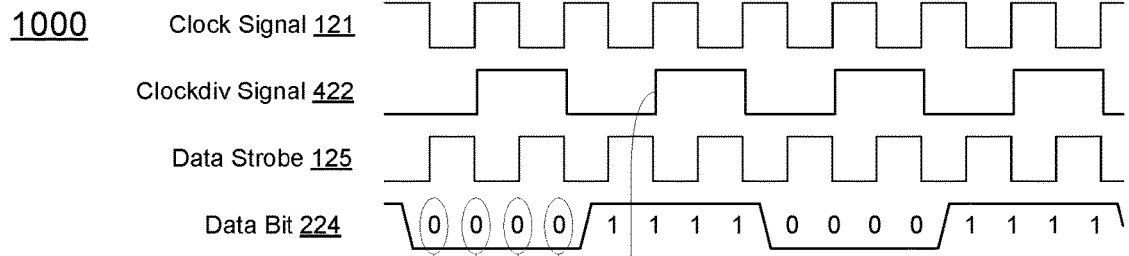
FIG. 10 illustrates two timing diagrams depicting waveforms for signals associated with an embodiment of a data receiver circuit.
Figure 10:
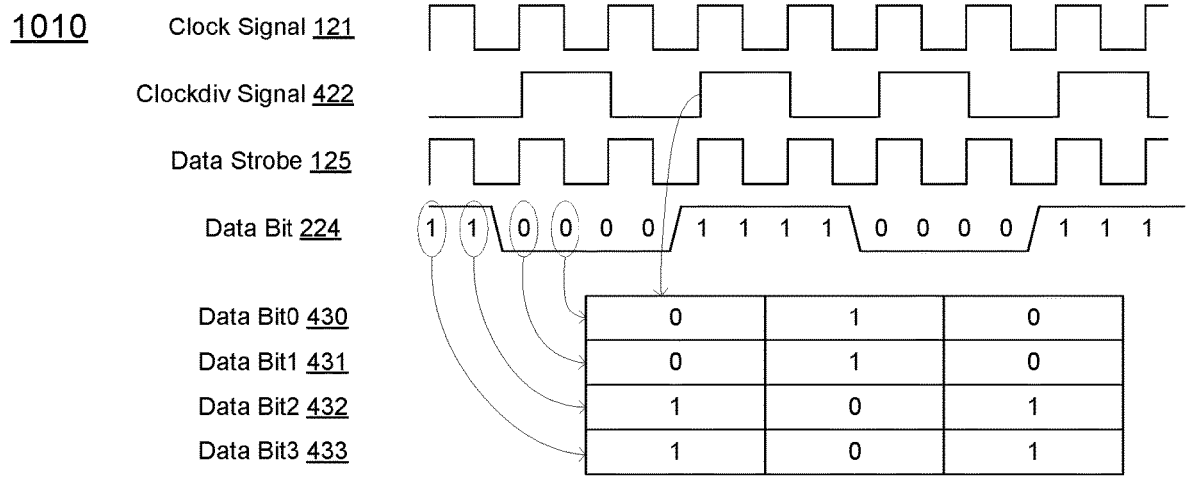

Turning now to FIG. 10, two charts are shown that illustrate a relationship between clockdiv signal 422 and data strobe signal 125. Charts 1000 and 1010 depict waveforms that may occur during some embodiments of a training operation conducted on first device 101. The two charts in FIG. 10 include the same signals as shown in the charts of FIG. 6, and may be associated with any one of data bit signals 224a-224h and SerDes circuits 210a-210h. As shown, clockdiv signal 422 transitions on each rising transition of internal clock signal 121. Chart 1000 shows data strobe signal 125 with what is, in some embodiments, a desired 180 degree phase delay from internal clock signal 121. In contrast, chart 1010 depicts data strobe signal 125 with what is, in some embodiments, a less desirable 0 degree phase shift from internal clock signal 121.

As illustrated, second device 110 sends a known data pattern to first device 101 via data bit signal 224. The data pattern in this embodiment corresponds to a quarter-rate pattern in that by sending alternating values of 0b0000 and 0b1111, data bit signal 224 transitions at one-quarter of the rate that internal clock signal 121 and data strobe signal 125 transition. This slower rate of change on data bit signal 224 increases a number of transitions of data strobe signal 125 that occur between transitions of data bit signal 224, allowing a training algorithm to direct a first step towards detecting a timing relationship between data strobe signal 125 and internal clock signal 121. The quarter-rate pattern allows unknown skew between data bit signal 224 and data strobe signal 125 to be temporarily ignored so that the algorithm may focus on the phase shift between data strobe signal 125 and internal clock signal 121 first. Skew between data bit signal 224 and data strobe signal 125 may addressed subsequently.

For example, in chart 1000, alternating four-bit values of 0b0000 and 0b1111 are correctly sampled by a corresponding SerDes circuit 210. In chart 1010, a less desirable alignment between data strobe signal 125 and internal clock signal 121 results in incorrect values of 0b1100 and 0b0011 being sampled. Using a suitable algorithm, a training operation may utilize the quarter-rate data pattern to determine a timing relationship between data strobe signal 125 and internal clock signal 121.

Figure 11:
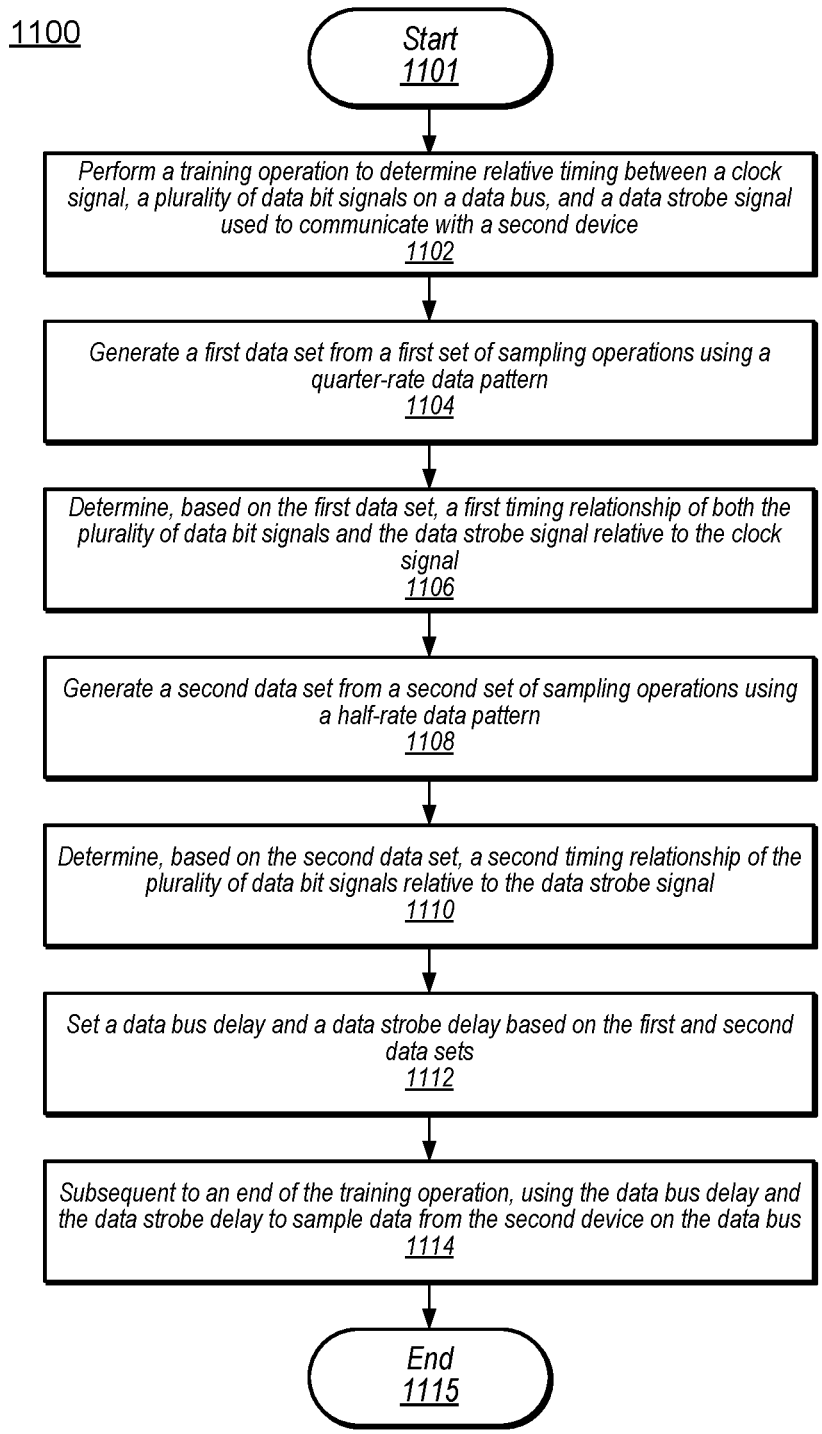
FIG. 11 is a flow diagram showing another method for performing a training operation on a data receiver circuit.

Moving now to FIG. 11, a flow diagram of an embodiment of a method for a training operation that uses a quarter-rate data pattern to detect a timing relationship between a data strobe signal and a clock signal is shown. Method 1100 may be applied to first device 101 to compensate for non-idealities in the circuits and connections of a data bus interface between first device 101 and second device 110. Completion of method 1100 may result in a reduced bit error rate and/or an improved transfer speed when first device 101 receives data from second device 110.

Referring to first device 101 in FIGS. 1 and 2 and to the flowchart of FIG. 11, method 1100 begins in block 1101. A first device performs a training operation to determine relative timing among a clock signal, a plurality of data bit signals on a data bus, and a data strobe signal used to communicate with a second device (block 1102). As illustrated, first device 101 may initiate the training operation, including causing control circuit 103 to perform some or all of the steps of method 1100. As described above, the training operation may be initiated for a variety of reasons such as in response to a periodic re-training process to maintain a particular level of performance, or in response to a determination that one or more operating conditions (e.g., a power supply voltage level, operating temperature, etc.) has changed by a threshold amount, or other similar reasons.

The first device generates a first data set from a first set of sampling operations using a quarter-rate data pattern (block 1104). As a first step of the training operation, first device 101 sends a request to second device 110 to send a quarter-rate data pattern, such as illustrated in FIG. 10, on each of data bit signals 224a-224h. Delay values for delay circuits 205 and 206 are set to an initial value, such as zero delay, and SerDes circuits 210a-210h sample four consecutive data bits on respective data bit signals 224a-224h. In various embodiments, the four-bit data values are either saved or compared to two or more passing values and a value saved indicating if the sampled value matches one of the passing values or a different value. Delay values for all delay circuits 205 are incremented while delay values for all of delay circuits 206 remain at the initial delay value. The sampling is repeated until a final delay value for delay circuits 205 is reached, at which point, delay values for delay circuits 206 are incremented while delay values for all of delay circuits 205 remain at the final delay value. The sampling again continues until the final delay value for delay circuits 206 is reached. Either sampled values or passing indicator values are saved after each increment of the delay values. This method sweeps data strobe signal 125 and data bit signals 224a-224h, in unison, across an entire delay range relative to internal clock signal 121. The saved values correspond to the first data set.

The first device determines, based on the first data set, a first timing relationship of both the plurality of data bit signals and the data strobe signal relative to the clock signal (block 1106). To determine the first timing relationship, first device 101 determines if the sampled values all correspond to a single known data pattern. If so, then delay values for delay circuits 205 and 206 are set to a middle delay value between the initial delay value and the final delay value, and the method moves to block 1108. Otherwise, first device 101 identifies a transition region from a first passing value to a second passing value and determines a mid-transition value in the middle of this region. If the mid-transition value is less than the middle delay value, then a predetermined value (e.g., the middle delay value) is added to the mid-transition value and the result is used as a total delay value for delay circuits 205 and 206 combined. Otherwise, the predetermined value is subtracted from the mid-transition value and this result is used as the total delay value for delay circuits 205 and 206. The first step of the training operation is complete.

The first device generates a second data set from a second set of sampling operations using a half-rate data pattern (block 1108). As a second step of the training operation, first device 101 sends a request to second device 110 to send a half-rate data pattern, such as illustrated in FIGS. 5 and 6, on each of data bit signals 224a-224h. The delay for data strobe signal 125 remains at the value set at the first step while the delay values for data bit signals 224a-224h are swept over a particular range of delay values. Accordingly, delay circuits 205s and 206s remain set at the delay values from the first step and delay values for delay circuits 205a-205h and 206a-206h are set based on the results from the first step.

If the delay values from the first step are less than a lower threshold value (e.g., one-quarter of the entire delay value range) then the delay values for delay circuits 205a-205h and delay circuits 206 are set to the initial delay value and the delay value for delay circuit 205s is set based on the lower threshold value. If the delay values from the first step are greater than an upper threshold value (e.g., three-quarters of the entire delay value range) then the delay values for delay circuits 205 are set to a maximum delay value and the delay values for delay circuits 206a-206h are set to the initial delay value and the delay value for delay circuit 206s is set based on the upper threshold value.

SerDes circuits 210a-210h again sample four consecutive data bits on respective data bit signals 224a-224h. The four-bit data values are, in various embodiments, either saved or compared to two or more passing values and a value saved indicating if the sampled value matches one of the passing values or a different value. Delay values for delay circuits 205a-205h are incremented while delay values for all of delay circuits 206a-206h remain at their initial values. The sampling is repeated until a final delay value for delay circuits 205a-205h is reached, at which point, delay values for delay circuits 206a-206h are incremented while delay values for all of delay circuits 205a-205h remain at the final delay value. The sampling again continues until a predetermined number of sampled values have been collected. Either sampled values or passing indicator values are saved after each increment of the delay values. These saved values correspond to the second data set.

The first device determines, based on the second data set, a second timing relationship of the plurality of data bit signals relative to the data strobe signal (block 1110). The second data set includes a respective sub-set of sampled values corresponding to each of data bit signals 224a-224h. First device 101 identifies a transition region for each one of the subsets of the second data set in which the sampled values change from a first passing value to a second passing value. These first and second passing values in the second step may be different than the passing values used in the first step. First device 101 determines a respective offset value for each of the subsets of the second data set and generates corresponding delay values for each delay circuits 205a-205h and 206a-206h based on these offset values. New delay values for delay circuits 205s and 206s may be determined based on the old delay values from the first step and a particular one of the offset values, such as a maximum value of the offset values from the second step. The second step of the training operation is complete.

The first device sets a data bus delay and a data strobe delay based on the first and second data sets (block 1112). As shown, first device 101 may set delay circuits 205 and 206 to the respective delay values determined during the training operation. In some cases, the delay values determined in the second step of the training operation may be out of an acceptable range for delay circuits 205 and 206. For example, a determined delay value may have a value that is less than the initial delay value or greater than the final delay value. In such cases, the unacceptable delay values may be changed to the initial delay value or maximum delay value accordingly. The training operation may end at this point.

Subsequent to an end of the training operation, the first device uses the data bus delay and the data strobe delay to sample data from the second device on the data bus (block 1114). After the training operation has been completed, then first device 101 may use data bus 123 to exchange data with second device 110. The timing delays set by the training operation may reduce a bit error rate when receiving data from second device 110 via data bus 123 and/or may enable higher data rates to be employed, thereby improving performance of the system. The method ends in block 1115.

The devices and methods described above may be associated with any suitable computer system. One example of a suitable computer system is depicted in FIG. 12.

Figure 12:
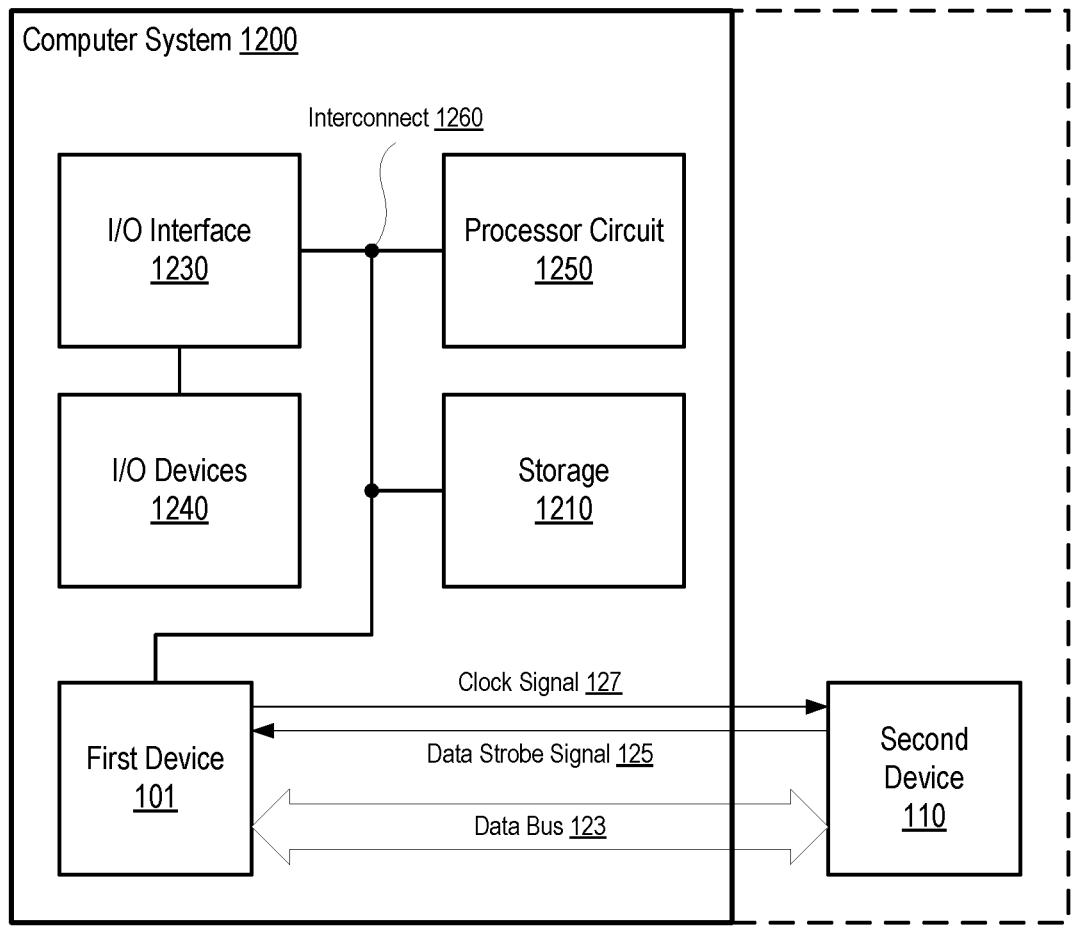

Proceeding now to FIG. 12, a block diagram of an example computer system is illustrated. Computer system 1200, in various embodiments, may correspond to any of the computer systems or other computing devices disclosed herein. Computer system 1200 may be any suitable type of device, including, but not limited to, a personal computer system, desktop computer, mainframe computer system, web server, workstation, or network computer. Furthermore, in some embodiments, computer system 1200 may correspond to a mobile device such as, e.g., a tablet computer, smart phone, a laptop computer, or a wearable computer system. As shown, computer system 1200 includes processor circuit 1250, storage 1210, input/output (I/O) interface 1230 coupled via an interconnect 1260 (e.g., a system bus). I/O interface 1230 may be coupled to one or more I/O devices 1240.

In various embodiments, processor circuit 1250 includes one or more processors. Processor circuit 1250 may also include one or more coprocessor units. In some embodiments, multiple instances of processor circuit 1250 may be coupled to interconnect 1260. Processor circuit 1250 (or each processor within 1250) may contain a cache or other form of on-board memory. In some embodiments, processor circuit 1250 may be implemented as a general-purpose processor circuit, and in other embodiments it may be implemented as a special purpose processor circuit (e.g., an ASIC). In general, computer system 1200 is not limited to any particular type of processor circuit or processor subsystem.

As used herein, the terms "processor circuit" or "processing element" refer to circuitry configured to perform operations or to a memory having program instructions stored therein that are executable by one or more processors to perform operations. Accordingly, a processor circuit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processor circuit may also be implemented in programmable hardware devices such as field programmable gate arrays, programmable array logic, programmable logic devices, or the like. A processor circuit may also be configured to execute program instructions from any suitable form of non-transitory computer-readable media to perform specified operations, such as the methods disclosed above.

Storage subsystem 1210 is usable by processor circuit 1250 (e.g., to store instructions executable by and data used by processor circuit 1250). Storage subsystem 1210 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1210 may consist solely of volatile memory in one embodiment. Storage subsystem 1210 may store program instructions executable by computer system 1200 using processor circuit 1250, including program instructions executable to cause computer system 1200 to implement the various techniques disclosed herein.

In some embodiments, methods and systems disclosed herein may be implemented in whole or in part with computer code that is executable on one or more processor circuits such as processor circuit 1250. Thus, various operations described herein may be performed by executing program instructions stored on a non-transitory computer-readable medium and executed by processor circuit 1250. The program instructions may be stored in storage subsystem 1210, or provided on any media capable of sharing program code, such as a compact disk (CD) medium, digital versatile disk (DVD) medium, a floppy disk, a flash-based storage, and the like. Additionally, the entire program code, or portions thereof, may be transmitted and downloaded from a software source such as, e.g., via the Internet, or a file transfer protocol (FTP) server, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a mobile computing system such as, for example, in C, C+, HTML, Java, JavaScript, or other such programming languages.

I/O interface 1230 may represent one or more interfaces and may be any of various types of interfaces configured to couple to and communicate with other devices, according to various embodiments. In one embodiment, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

As illustrated, computer system 1200 includes first device 101 and includes connections for external clock signal 127, data strobe signal 125, and data bus 123. In some embodiments, second device 110 is also included in computer system 1200. In such embodiments, first device 101 and second device 110 may be coupled together by, e.g., traces on a circuit board. In other embodiments, second device may correspond to a different computing device such as another computer system or a storage device. In these other embodiments, first device 101 and second device 110 may be coupled together by, for example, one or more cables.

It is noted that FIG. 12 is merely an example for demonstrating disclosed concepts. Only components and data movement necessary to illustrate these concepts are shown in FIG. 12. Additional and/or different components or data movements may be included in other embodiments.

It is noted that the above-described embodiments may be implemented, in part or in whole, by software stored in a system and executed by a processor circuit. In such an embodiment, the program instructions that implement the methods and/or mechanisms may be conveyed or stored on a computer-readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
  a first device having a clock signal and configured to communicate, via a data bus, with a second device configured to assert a data strobe signal and a plurality of data bit signals on the data bus, wherein the first device includes:
    a control circuit configured, during a training phase, to determine relative timing between the clock signal, the plurality of data bit signals, and the data strobe signal, including by:
      determining, using a first set of sampling operations, a first timing relationship of the plurality of data bit signals relative to the data strobe signal;
      determining, using a second set of sampling operations, a second timing relationship of the plurality of data bit signals and the data strobe signal relative to the clock signal; and
      redetermine, using a third set of sampling operations, the first timing relationship of the plurality of data bit signals relative to the data strobe signal; and
    wherein the control circuit is configured, during an operational phase, to use delays based on the redetermined first timing relationship and second timing relationship to sample data from the second device on the data bus.

2. The apparatus of claim 1, wherein the first device further includes:
  a first set of delay circuits coupled to respective ones of the plurality of data bit signals and the data strobe signal; and
  a second set of delay circuits coupled to respective outputs of the first set of delay circuits.

3. The apparatus of claim 2, wherein to use delays based on the redetermined first timing relationship and the second timing relationship, the control circuit is further configured to:
  use the first timing relationship to set respective delay values for the first set of delay circuits; and
  use the second timing relationship to set respective delay values for the second set of delay circuits.

4. The apparatus of claim 3, wherein the control circuit is further configured to use the redetermined first timing relationship to adjust respective delay values for the second set of delay circuits.

5. The apparatus of claim 1, wherein to perform a given set of sampling operations, the control circuit is further configured to request a known data pattern from the second device, wherein the known data pattern is a half-rate pattern.

6. The apparatus of claim 1, wherein to perform a given set of sampling operations, the control circuit is further configured to store a sample value for a particular data bit signal after sampling a plurality of consecutive bit values on the particular data bit signal.

7. The apparatus of claim 6, wherein the control circuit is further configured to store a current delay value associated with the data strobe signal with the stored sample value.

8. A method comprising:
performing, by a first device, a training operation to determine relative timing between a clock signal, a plurality of data bit signals on a data bus, and a data strobe signal used to communicate with a second device, wherein the training operation includes:
determining, by the first device, a first timing relationship of the plurality of data bit signals relative to the data strobe signal using a first data set from a first set of sampling operations;
determining, by the first device, a second timing relationship of the plurality of data bit signals and the data strobe signal relative to the clock signal using a second data set from a second set of sampling operations;
generating, by the first device, a third data set from a third set of sampling operations that utilize delays based on the first and second timing relationships; and
redetermining, by the first device using the third data set, the first timing relationship of the data bus relative to the data strobe signal; and
using, by the first device during an operational phase, delays based on the redetermined first timing relationship and the second timing relationship to sample data from the second device on the data bus.

9. The method of claim 8, further comprising setting, by the first device using the first timing relationship, delay values for a first set of delay circuits coupled to the data bus.

10. The method of claim 9, further comprising setting, by the first device using the second timing relationship, delay values for a second set of delay circuits coupled to the first set of delay circuits.

11. The method of claim 10, further comprising resetting, by the first device using the redetermined first timing relationship, delay values for the second set of delay circuits.

12. The method of claim 8, further comprising:
setting, by the first device using the first timing relationship, a first delay value for a first delay circuit coupled to the data strobe signal; and
setting, by the first device using the second timing relationship, a second delay value for a second delay circuit coupled to the first delay circuit.

13. The method of claim 12, further comprising resetting, by the first device using the redetermined first timing relationship, the second delay value for the second delay circuit.

14. The method of claim 8, further comprising performing a particular set of sampling operations by:
requesting a known data pattern be sent by the second device; and
storing a sample value for a given one of the data bit signals, wherein the sample value corresponds to a plurality of consecutive data bits sampled on the given data bit signal.

15. A system comprising:
a first set of delay circuits coupled to a data strobe signal and a data bus that includes a plurality of data bit signals;
a second set of delay circuits coupled to the first set of delay circuits; and
a control circuit configured, while performing a training operation to set delay values for the first and second sets of delay circuits, to:
determine a first set of results from a first set of sampling operations that use the plurality of data bit signals and the data strobe signal;
set a first group of delay values for the first set of delay circuits using the first set of results;
determine a second set of results from a second set of sampling operations that use the plurality of data bit signals, the data strobe signal, and a clock signal included in the system; and
set a second group of delay values for the second set of delay circuits using the second set of results; and
wherein the control circuit is further configured, subsequent to an end of the training operation, to use the first and second sets of delay circuits to sample, based on the data strobe signal, the plurality of data bit signals on the data bus.

16. The system of claim 15, wherein the control circuit is further configured, while performing the training operation, to:
determine a third set of results from a third set of sampling operations that use the plurality of data bit signals and the data strobe signal; and
adjust the second group of delay values for the second set of delay circuits using the third set of results.

17. The system of claim 15, wherein to perform the first set of sampling operations, the control circuit is configured to:
sample a plurality of consecutive bit values of a particular data bit signal; and
generate a single sample value using the plurality of consecutive bit values.

18. The system of claim 17, wherein to perform the first set of sampling operations the control circuit is further configured to:
compare the single sample value to an expected value; and
include a result of the comparison in the first set of results.

19. The system of claim 17, wherein the system further includes a plurality of serializer/deserializer (SerDes) circuits coupled to respective ones of the second set of delay circuits, and wherein the control circuit is further configured to use a particular one of the SerDes circuits to sample the plurality of consecutive bit values and to generate the single sample value.

20. The system of claim 15, wherein to perform the second set of sampling operations, the control circuit is further configured to use a range of delay values for the second set of delay circuits while the first set of delay circuits are set to the first group of delay values.

* * * * *